US011183063B2

(12) United States Patent
Noguchi et al.

(10) Patent No.: US 11,183,063 B2
(45) Date of Patent: Nov. 23, 2021

(54) RECOGNITION AND GUIDANCE TO SPECIALIZED STOP SPACES FOR DIFFERENT SIZED VEHICLES

(71) Applicant: HONDA MOTOR CO., LTD., Tokyo (JP)

(72) Inventors: Junpei Noguchi, Wako (JP); Chie Sugihara, Tokyo (JP); Ryoma Taguchi, Tokyo (JP); Yuta Takada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/857,239

(22) Filed: Apr. 24, 2020

(65) Prior Publication Data

US 2020/0365027 A1     Nov. 19, 2020

(30) Foreign Application Priority Data

May 13, 2019    (JP) .............................. JP2019-090965

(51) Int. Cl.
     *G08G 1/14*          (2006.01)
     *B60W 60/00*       (2020.01)
     *G08G 1/00*          (2006.01)

(52) U.S. Cl.
     CPC ........ *G08G 1/146* (2013.01); *B60W 60/00253* (2020.02); *G08G 1/142* (2013.01); *G08G 1/20* (2013.01)

(58) Field of Classification Search
     CPC .......... G08G 1/146; G08G 1/142; G08G 1/20; B60W 60/00253
     USPC ....................................................... 340/932.2
     See application file for complete search history.

(56) References Cited

U.S. PATENT DOCUMENTS

| | | | |
|---|---|---|---|
| 2019/0263320 A1* | 8/2019 | Onodera | B60Q 9/00 |
| 2020/0101967 A1* | 4/2020 | Seki | G06K 9/00791 |
| 2020/0108824 A1* | 4/2020 | Bettger | G05D 1/0231 |
| 2020/0242924 A1* | 7/2020 | Publicover | G08G 1/096758 |
| 2020/0262453 A1* | 8/2020 | Mimura | B60W 60/00253 |
| 2020/0298835 A1* | 9/2020 | Suzuki | B62D 1/00 |

FOREIGN PATENT DOCUMENTS

| | | |
|---|---|---|
| JP | 2000-194417 | 7/2000 |
| JP | 2018-145655 | 9/2018 |

\* cited by examiner

*Primary Examiner* — Emily C Terrell
(74) *Attorney, Agent, or Firm* — Amin, Turocy & Watson, LLP

(57) ABSTRACT

A management device includes a recognizer configured to recognize a use situation of a specific area for stopping of a vehicle, and a guide configured to guide a second vehicle having a smaller vehicle body than a vehicle body of a first vehicle to the specific area when there is no first stop space and there is a second stop space in the specific area, on the basis of the use situation recognized by the recognizer, the first stop space is a space in which the first vehicle or the second vehicle is able to stop, and the second stop space is a space in which the first vehicle is not able to stop and the second vehicle is able to stop.

12 Claims, 21 Drawing Sheets

FIG. 9

| STOP SPACE | SPACE SIZE |
|---|---|
| X1cm × X3cm | S |

436

| PRIORITY | VEHICLE ID | VEHICLE SIZE |
|---|---|---|
| 01 | 001 | M |
| 02 | 002 | S |
| 03 | 003 | M |
| ⋮ | ⋮ | ⋮ |

| VEHICLE ID | REWARD | PARKING FEE |
|---|---|---|
| 001 | -○○ Yen | ○× Yen |
| 002 | none | ○× Yen |
| 003 | none | ○× Yen |
| ⋮ | ⋮ | ⋮ |

RECOGNITION AND GUIDANCE TO SPECIALIZED STOP SPACES FOR DIFFERENT SIZED VEHICLES

CROSS-REFERENCE TO RELATED APPLICATION

Priority is claimed on Japanese Patent Application No. 2019-090965, filed on May 13, 2019, the content of which is incorporated herein by reference.

BACKGROUND

Field

The present invention relates to a management device, a management method, and a storage medium.

Description of Related Art

In the related art, there are boarding and alighting areas configured to be available for both alighting and boarding, and a display device that displays, to a driver, information on an area used as an alighting area in a boarding and alighting area or information on an area used as a boarding area in a boarding and alighting area is disclosed (Japanese Unexamined Patent Application, First Publication No. 2018-145655 and Japanese Unexamined Patent Application, First Publication No. 2000-194417). However, since the related art does not disclose changing a priority of use of the boarding and alighting area, the use of the boarding and alighting area may not be performed efficiently.

SUMMARY

The present invention has been made in view of such circumstances, and an object of the present invention is to provide a management device, a management method, and a storage medium capable of allowing facilities to be used more efficiently.

A management device, a management method, and a storage medium according to the present invention adopt the following configurations.

(1): A management device according to an aspect of the present invention includes a recognizer configured to recognize a use situation of a specific area for stopping of a vehicle; and a guide configured to guide a second vehicle having a smaller vehicle body than a vehicle body of a first vehicle to the specific area when there is no first stop space and there is a second stop space in the specific area, on the basis of the use situation recognized by the recognizer, wherein the first stop space is a space in which the first vehicle or the second vehicle is able to stop, and the second stop space is a space in which the first vehicle is not able to stop and the second vehicle is able to stop.

(2): In the aspect (1), the specific area is an area different from a parking lot, the specific area being an area in which a user of the vehicle boards, an area in which the user alights, an area in which the user takes luggage out of the vehicle, or an area in which the user loads luggage into the vehicle.

(3): In the aspect (1) or (2), the vehicle is a vehicle that exits the parking lot through automated driving or a vehicle that enters the parking lot from the specific area through automated driving.

(4): In any one of the aspects (1) to (3), in a case in which the first vehicle and the second vehicle sequentially wait for the use of the specific area, the guide guides the second vehicle to the specific area when there is no first stop space and there is the second stop space, and guides the first vehicle to the specific area when there is the first stop space.

(5): In any one of the aspects (1) to (4), an order of use of the specific area is set on the basis of an order of arrangement of vehicles at a position designated for use of the specific area.

(6): In any one of the aspects (1) to (5), the guide guides the second vehicle to pass the first vehicle when the guide guides the second vehicle to the specific area.

(7): In the aspect (6), when the first vehicle and a plurality of second vehicles sequentially wait for use of the specific area in this order and the second stop space appears continuously, the guide limits the number of second vehicles that pass the first vehicle.

(8): In any one of the aspects (1) to (7), when the second vehicle is a vehicle needing use of the first stop space designated in advance, the guide regards the second vehicle as the first vehicle.

(9): In any one of the aspects (1) to (8), the management device further includes: an imparter configured to impart a reward to the first vehicle when the second vehicle has preference over the first vehicle in a case in which there is no first stop space and there is the second stop space in the specific area.

(10): In any one of the aspects (1) to (9), when there is no first stop space and there is the second stop space in the specific area, and a vehicle stopping in a space adjacent to the second stop space is estimated to start to travel within a predetermined time, the guide interrupts guidance of the second vehicle to the specific area or guides the first vehicle to the specific area.

(11): A management method according to an aspect of the present invention includes recognizing, by a computer, a use situation of a specific area for stopping of a vehicle; and guiding, by the computer, a second vehicle having a smaller vehicle body than a vehicle body of a first vehicle to the specific area when there is no first stop space and there is a second stop space in the specific area, on the basis of the recognized use situation, wherein the first stop space is a space in which the first vehicle or the second vehicle is able to stop, and the second stop space is a space in which the first vehicle is not able to stop and the second vehicle is able to stop.

(12): According to an aspect of the present invention, a non-transitory computer-readable storage medium that stores a computer program to be executed by a computer to perform at least: recognize a use situation of a specific area for stopping of a vehicle; and guide a second vehicle having a smaller vehicle body than a vehicle body of a first vehicle to the specific area when there is no first stop space and there is a second stop space in the specific area, on the basis of the recognized use situation, wherein the first stop space is a space in which the first vehicle or the second vehicle is able to stop, and the second stop space is a space in which the first vehicle is not able to stop and the second vehicle is able to stop.

According to (1) to (6), (11) and (12), it is possible to use facilities more efficiently.

According to (7), since the management device limits the number of times an order in which the vehicle travels to the specific area is repeatedly lowered, it is possible to ensure fairness. Further, a sense of satisfaction of the vehicle of which order is repeatedly lowered is improved.

According to (8), when the second vehicle is a vehicle needing the use of the first stop space designated in advance, the management device regards the second vehicle as the first vehicle, thereby specifying a vehicle to be guided according to a use aspect of the vehicle and further curbing use of facilities that are not intended by a user of the second vehicle. As a result, satisfaction of the user is improved.

According to (9), the management device imparts the reward to the first vehicle, thereby improving a sense of satisfaction of the first vehicle.

According to (10), when there is no first stop space and there is the second stop space, and a vehicle stopping in a space adjacent to the second stop space is estimated to start to travel within a predetermined time, the management device interrupts the guide or guides the first vehicle to the specific area, thereby realizing control according to a status of the vehicle present in the specific area. Thereby, it is possible to more fairly specify a vehicle to be guided to the specific area.

BRIEF DESCRIPTION OF THE DRAWINGS

FIG. 9 is a conceptual diagram for when a process in scene 2 is performed.

FIG. 12 is a diagram showing an example of content of management information including information indicating a reward.

DETAILED DESCRIPTION

Hereinafter, embodiments of a management device, a management method, and a storage medium of the present invention will be described with reference to the drawings.

First Embodiment

[Overall Configuration]

Figure 1:
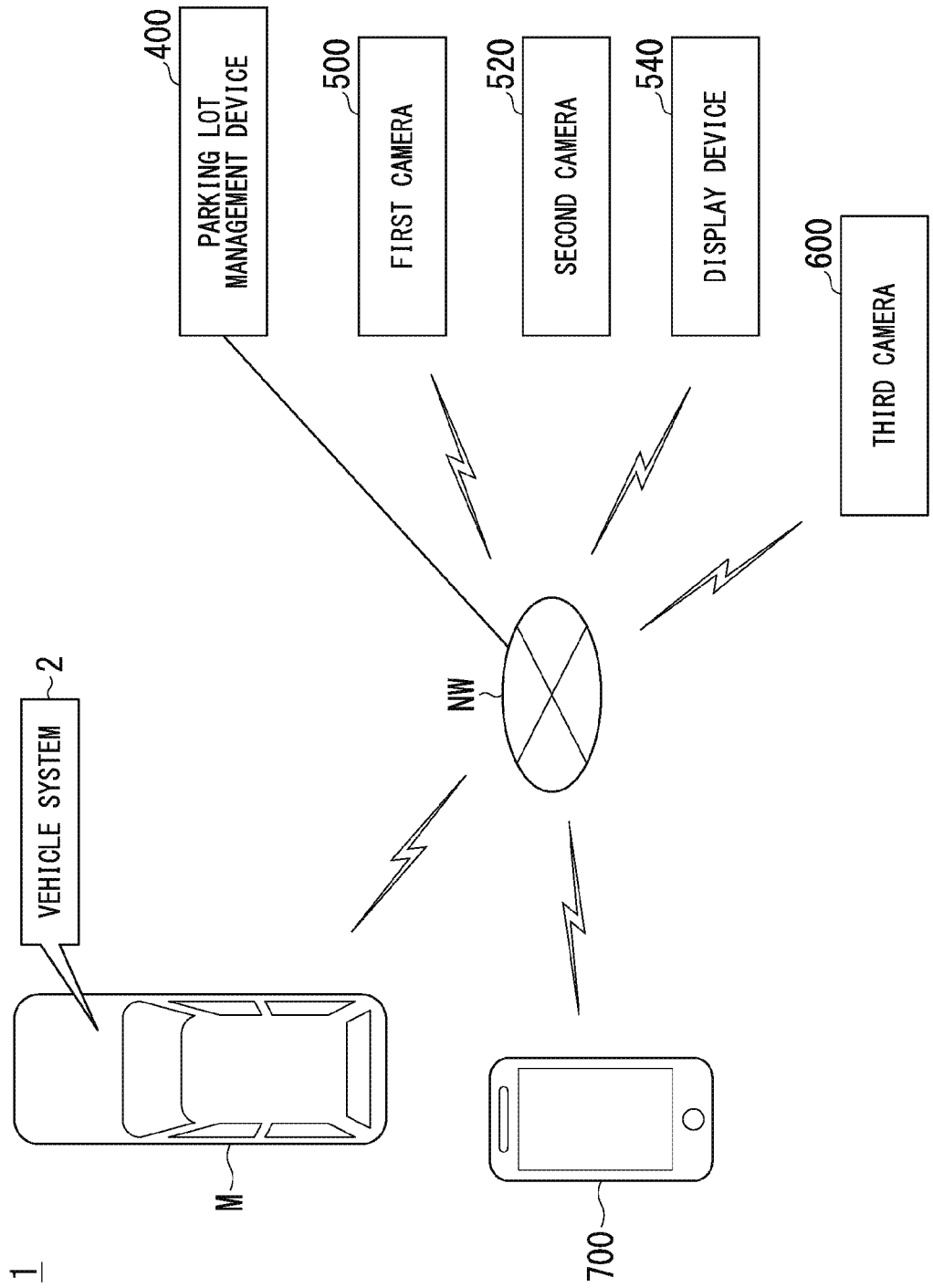
FIG. 1 is a configuration diagram of a parking lot management system including a vehicle system.

FIG. 1 is a configuration diagram of a parking lot management system 1 including a vehicle system 2. The parking lot management system 1 includes, for example, one or more vehicles equipped with the vehicle system 2 (hereinafter referred to as a vehicle M), one or more parking lot management devices 400, one or more first cameras 500, one or more second cameras 520, one or more display devices 540, one or more third cameras 600, and one or more terminal devices 700. These components can communicate with each other via a network NW. The boarding and alighting area is configured to be available for both alighting and boarding, and these components may perform wireless communication directly without passing through the network NW. The network NW includes a cellular network, a Wi-Fi network, the Internet, a wide area network (WAN), a local area network (LAN), a public line, a provider device, a dedicated line, a wireless base station, and the like. These components may perform wireless communication directly without passing through the network NW. Details of the vehicle M, the parking lot management device 400, the first camera 500 to the third camera 600, and the like will be described below.

The terminal device 700 is a terminal device that can be carried by the user, such as a smartphone, a tablet terminal, and a personal computer. The terminal device 700 communicates with the vehicle M, transmits a user request to the vehicle M or performs a push notification based on information received from the vehicle M or the parking lot management device 400.

Figure 2:
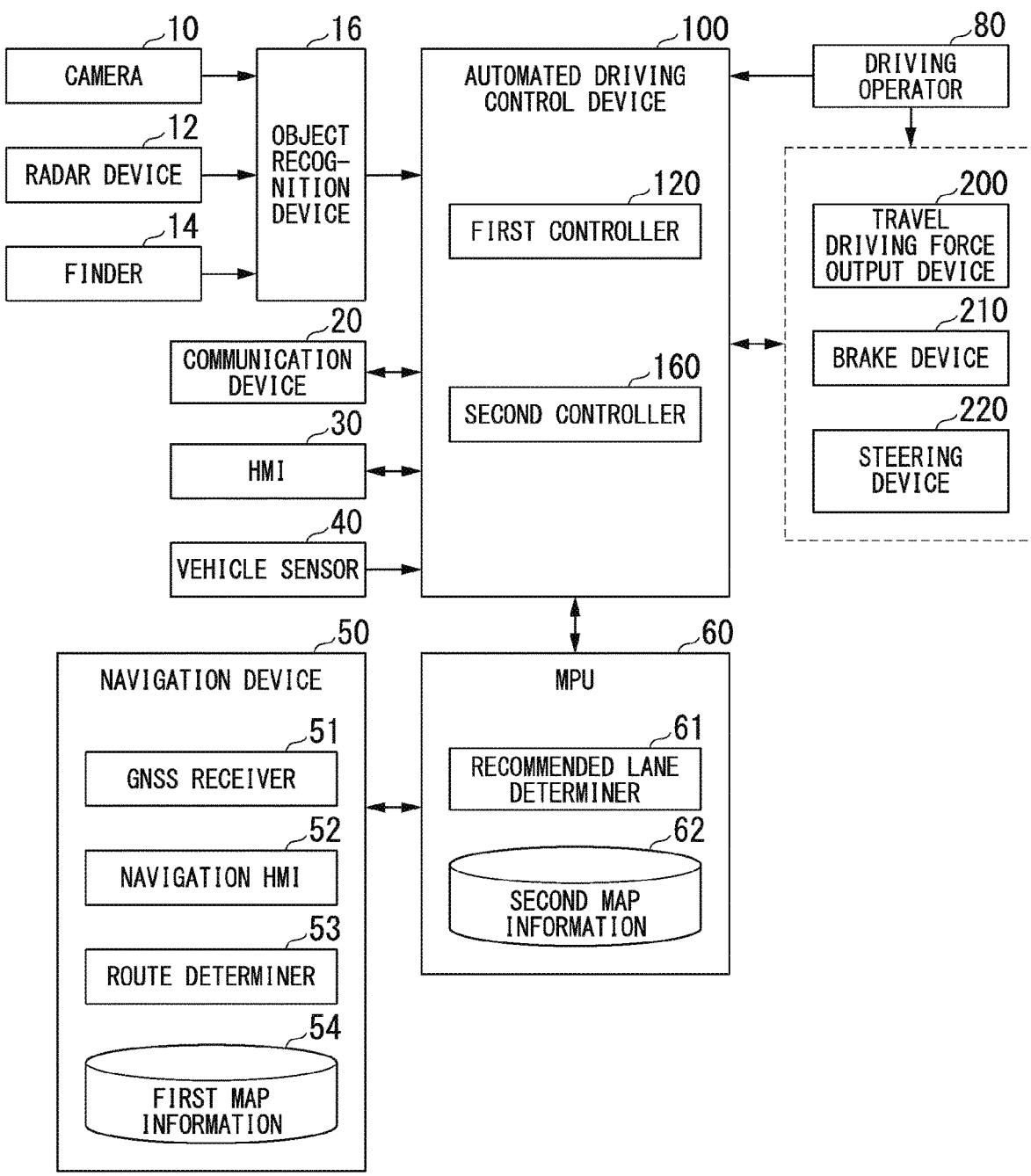
FIG. 2 is a diagram showing an example of a functional configuration of the vehicle system.

FIG. 2 is a diagram showing an example of a functional configuration of the vehicle system 2. The vehicle in which the vehicle system 2 is mounted is, for example, a vehicle such as a two-wheeled vehicle, a three-wheeled vehicle, or a four-wheeled vehicle. A driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 2 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or equipment are connected to each other by a multiplex communication line such as a controller area network (CAN) communication line, a serial communica- tion line, a wireless communication network, or the like. The configuration shown in FIG. 1 is merely an example, and a part of the configuration may be omitted or another configuration may be added.

The camera 10 is, for example, a digital camera using a solid-state imaging device such as a charge-coupled device (CCD) or a complementary metal-oxide semiconductor (CMOS). The camera 10 is attached to any place on a vehicle in which the vehicle system 2 is mounted. The vehicle system 2 includes, for example, a plurality of cameras 10. The camera 10 is attached to, for example, an upper portion of a front windshield or a rear surface of a rearview mirror, and images an area in front of the vehicle. The camera 10 is attached to, for example, an upper part of a rear windshield, near a license plate on the rear outside of the vehicle, or near a trunk door on a rear outside of the vehicle, and images an area behind the vehicle. The camera 10, for example, periodically and repeatedly images surroundings of the vehicle M. The camera 10 may be a stereo camera.

The radar device 12 radiates radio waves such as millimeter waves to the surroundings of the vehicle M and detects radio waves (reflected waves) reflected by an object to detect at least a position (a distance and orientation) of the object. The radar device 12 is attached to any place on the vehicle M. The radar device 12 may detect a position and a speed of the object using a frequency modulated continuous wave (FM-CW) scheme.

The finder 14 is a light detection and ranging (LIDAR) system. The finder 14 radiates light to the surroundings of the vehicle M and measures scattered light. The finder 14 detects a distance to a target on the basis of a time from light emission to light reception. The radiated light is, for example, pulsed laser light. The finder 14 is attached to any place on the vehicle M.

The object recognition device 16 performs a sensor fusion process on detection results of some or all of the camera 10, the radar device 12, and the finder 14 to recognize a position, type, speed, and the like of the object. The object recognition device 16 outputs recognition results to the automated driving control device 100. The object recognition device 16 may output the detection results of the camera 10, the radar device 12, and the finder 14 as they are to the automated driving control device 100. The object recognition device 16 may be omitted from the vehicle system 2.

The communication device 20, for example, communicates with another vehicle or a parking lot management device (to be described below) present around the vehicle M, or various server devices using a cellular network, a Wi-Fi network, Bluetooth (registered trademark), dedicated short-range communication (DSRC), or the like.

The HMI 30 presents various types of information to the occupant of the vehicle M and receives an input operation from the occupant. The HMI 30 includes various display devices, speakers, buzzers, touch panel type display, switches, keys, and the like.

The vehicle sensor 40 includes, for example, a vehicle speed sensor that detects a speed of the vehicle M, an acceleration sensor that detects an acceleration, a yaw rate sensor that detects an angular speed around a vertical axis, and an orientation sensor that detects a direction of the vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies a position of the vehicle M on the basis of a signal received from a GNSS satellite. The position of the vehicle M may be specified or supplemented by an inertial navigation system (INS) using an output of the vehicle sensor 40. The navigation HMI 52 includes a display device, a speaker, a touch panel, keys, and the like. The navigation HMI 52 may be partly or wholly shared with the HMI 30 described above. The route determiner 53, for example, determines a route (hereinafter, an on-map route) from the position of the vehicle M specified by the GNSS receiver 51 (or any input position) to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The on-map route is output to the MPU 60. The navigation device 50 may perform route guide using the navigation HMI 52 on the basis of the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block by referring to the second map information 62. The recommended lane determiner 61 determines in which lane from the left the vehicle M travels. The recommended lane determiner 61 determines the recommended lane so that the vehicle M can travel on a reasonable route for travel to a branch destination when there is a branch place in the on-map route.

The second map information 62 is map information with higher accuracy than the first map information 54. The second map information 62 includes, for example, information on a center of the lane or information on a boundary of the lane. Further, the second map information 62 may include road information, traffic regulation information, address information (an address and postal code), facility information, telephone number information, and the like. The second map information 62 may be updated at any time by the communication device 20 communicating with another device.

The driving operator 80 includes, for example, an accelerator pedal, a brake pedal, a shift lever, a steering wheel, a variant steer, a joystick, and other operators. A sensor that detects the amount of operation or the presence or absence of operation is attached to the driving operator 80, and a detection result thereof is output to the automated driving control device 100 or some or all of the travel driving force output device 200, the brake device 210, and the steering device 220.

The automated driving control device 100 includes, for example, a first controller 120, and a second controller 160. The first controller 120 and the second controller 160 are realized, for example, by a hardware processor such as a central processing unit (CPU) executing a program (software). Some or all of these components may be realized by hardware (circuit portion; including circuitry) such as a large-scale integration (LSI), an application-specific integrated circuit (ASIC), a field-programmable gate array (FPGA) or a graphics-processing unit (GPU) or may be realized by software and hardware in cooperation. The program may be stored in a storage device (a storage device including a non-transitory storage medium) such as an HDD or a flash memory of the automated driving control device 100 in advance or may be stored in a detachable storage medium such as a DVD or a CD-ROM and installed in the HDD or the flash memory of the automated driving control device 100 by the storage medium (non-transitory storage medium) being mounted in a drive device.

Figure 3:
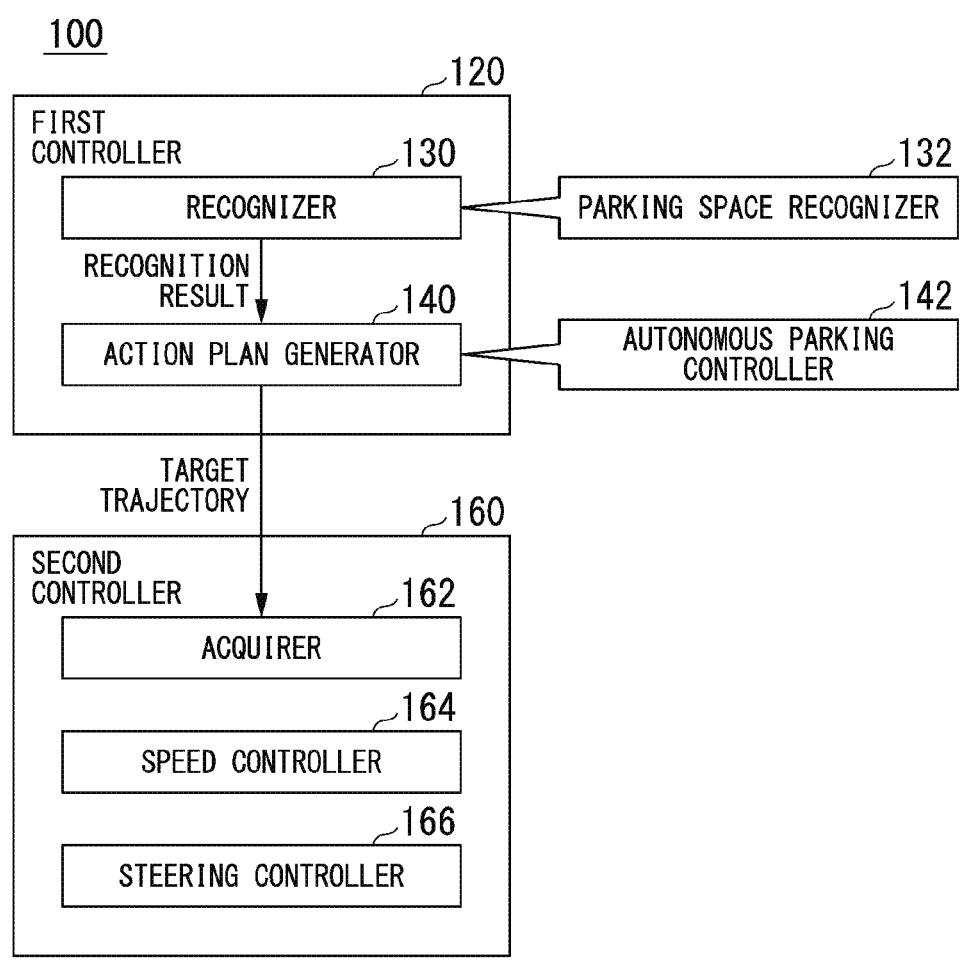
FIG. 3 is a functional configuration diagram of a first controller and a second controller.

FIG. 3 is a functional configuration diagram of the first controller 120 and the second controller 160. The first controller 120 includes, for example, a recognizer 130 and an action plan generator 140. The first controller 120 realizes, for example, a function using artificial intelligence (AI) and a function using a previously given model in parallel. For example, a function of "recognizing an intersection" may be realized by recognition of the intersection using deep learning or the like and recognition based on previously given conditions (there is a signal which can be subjected to pattern matching, a road sign, or the like) being executed in parallel and scored for comprehensive evaluation. Accordingly, the reliability of automated driving is ensured.

The recognizer 130 recognizes a status such as a position, a speed, and an acceleration of an object around the vehicle M on the basis of information input from the camera 10, the radar device 12, and the finder 14 via the object recognition device 16. The position of the object, for example, is recognized as a position at absolute coordinates with a representative point (a centroid, a drive shaft center, or the like) of the vehicle M as an origin, and is used for control. The position of the object may be represented by a representative point such as a centroid or a corner of the object or may be represented by a represented area. The "status" of the object may include an acceleration or jerk of the object, or an "action status" (for example, whether or not the object is changing lanes or is about to change lanes).

The recognizer 130, for example, recognizes a lane in which the vehicle M is traveling (a traveling lane). For example, the recognizer 130 compares a pattern of a road marking line (for example, an arrangement of a solid line and a broken line) obtained from the second map information 62 with a pattern of a road marking line around the vehicle M recognized from an image captured by the camera 10 to recognize the traveling lane. The recognizer 130 may recognize not only the road marking lines but also a traveling road boundary (a road boundary) including road demarcation lines, a road shoulder, a curb, a median strip, a guard rail, or the like to recognize the traveling lane. In this recognition, the position of the vehicle M acquired from the navigation device 50 or a processing result of an INS may be additionally considered. The recognizer 130 recognizes a temporary stop line, an obstacle, a red light, a toll gate, and other road events.

The recognizer 130 recognizes a position or posture of the vehicle M with respect to the traveling lane when recognizing the traveling lane. The recognizer 130 may recognize, for example, a deviation of a reference point of the vehicle M from a center of the lane and an angle formed between a traveling direction of the vehicle M and a line connecting the center of the lane as the relative position and posture of the vehicle M with respect to the traveling lane. Instead, the recognizer 130 may recognize, for example, a position of the reference point of the vehicle M with respect to any one of side end portions (the road marking line or the road boundary) of the traveling lane as the relative position of the vehicle M with respect to the traveling lane.

The recognizer 130 includes a parking space recognizer 132 that is activated in an autonomous parking event to be described below. Details of a function of the parking space recognizer 132 will be described below.

In principle, the action plan generator 140 generates a target trajectory along which the vehicle M will travel in the future automatically (without depending on an operation of a driver) so that the vehicle M can travel on the recommended lane determined by the recommended lane determiner 61 and cope with a surroundings situation of the vehicle M. The target trajectory includes, for example, a speed element. For example, the target trajectory is represented as a sequence of points (trajectory points) to be reached by the vehicle M. The trajectory point is a point that the vehicle M is to reach for each predetermined travel distance (for example, several meters) at a road distance, and a target speed and a target acceleration at every predetermined sampling time (for example, every several tenths of a [sec]) are separately generated as a part of the target trajectory. The trajectory point may be a position that the vehicle M is to reach at the sampling time at every predetermined sampling time. In this case, information on the target speed or the target acceleration is represented by an interval between the trajectory points.

When the action plan generator 140 generates the target trajectory, the action plan generator 140 may set an event of automated driving. Examples of the automated driving event include a constant speed traveling event, a low speed following driving event, a lane changing event, a branching event, a merging event, a takeover event, and an autonomous parking event in which a vehicle travels in an unmanned manner or automatically and is parked in valet parking or the like. The action plan generator 140 generates a target trajectory according to an activated event. The action plan generator 140 includes an autonomous parking controller 142 that is activated when the autonomous parking event is performed. Details of a function of the autonomous parking controller 142 will be described below.

The second controller 160 controls the travel driving force output device 200, the brake device 210, and the steering device 220 so that the vehicle M passes through the target trajectory generated by the action plan generator 140 at a scheduled time.

Referring back to FIG. 2, the second controller 160 includes, for example, an acquirer 162, a speed controller 164, and a steering controller 166. The acquirer 162 acquires information on the target trajectory (trajectory points) generated by the action plan generator 140 and stores the information on the target trajectory in a memory (not shown). The speed controller 164 controls the travel driving force output device 200 or the brake device 210 on the basis of the speed element incidental to the target trajectory stored in the memory. The steering controller 166 controls the steering device 220 according to a bent state of the target trajectory stored in the memory. Processes of the speed controller 164 and the steering controller 166 are realized by, for example, a combination of feedforward control and feedback control. For example, the steering controller 166 executes a combination of feedforward control according to a curvature of a road in front of the vehicle M and feedback control based on a deviation from the target trajectory.

The travel driving force output device 200 outputs a travel driving force (torque) for traveling of the vehicle to the driving wheels. The travel driving force output device 200 includes, for example, a combination of an internal combustion engine, an electric motor, a transmission, and the like, and an electronic control unit (ECU) that controls these. The ECU controls the above configuration according to information input from the second controller 160 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to information input from the second controller 160 or information input from the driving operator 80 so that a brake torque according to a braking operation is output to each wheel. The brake device 210 may include a mechanism that transfers the hydraulic pressure generated by the operation of the brake pedal included in the driving operator 80 to the cylinder via a master cylinder, as a backup. The brake device 210 is not limited to the configuration described above and may be an electronically controlled hydraulic brake device that controls the actuator according to information input from the second controller 160 and transfers the hydraulic pressure of the master cylinder to the cylinder.

The steering device 220 includes, for example, a steering ECU and an electric motor. The electric motor, for example, changes a direction of the steerable wheels by causing a force to act on a rack and pinion mechanism. The steering ECU drives the electric motor according to information input from the second controller 160 or information input from the driving operator 80 to change the direction of the steerable wheels.

[Autonomous Parking Event—at the Time of Entry]

Figure 4:
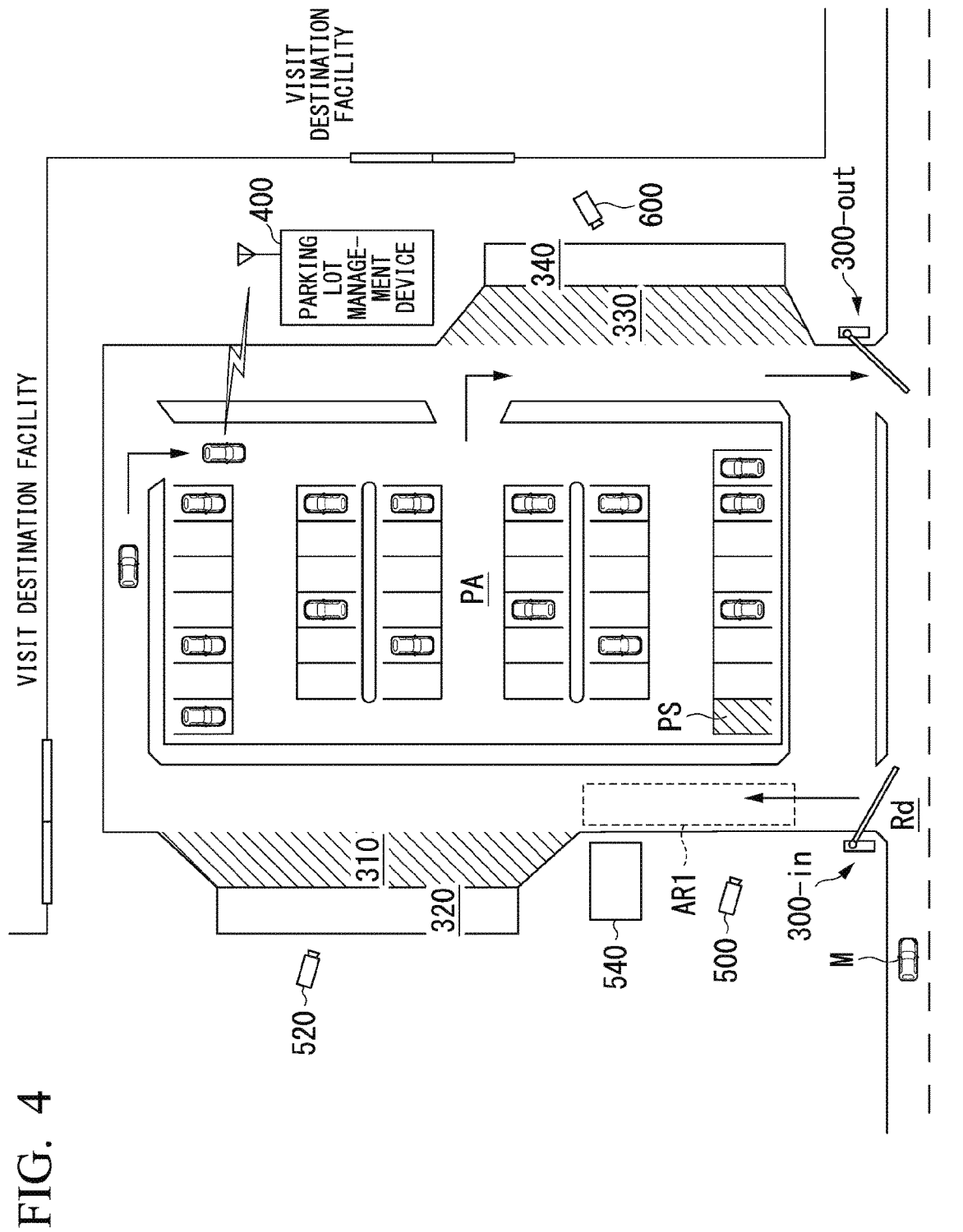
FIG. 4 is a diagram schematically showing a scene in which an autonomous parking event is executed.

The autonomous parking controller 142 parks the vehicle M in the parking space on the basis of information acquired from a parking lot management device 400 by the communication device 20, for example. FIG. 4 is a diagram schematically showing a scene in which the autonomous parking event is executed. Gates 300-in and 300-out are provided on a route from a road Rd to a visit destination facility. The vehicle M passes through the gate 300-in and travels to the stop area 310 through manual driving or automated driving. The stop area 310 faces a boarding and alighting area 320 connected to the visit destination facility. An eave for blocking rain or snow is provided in the boarding and alighting area 320.

After the occupant alights in the stop area 310, the vehicle M performs unmanned or manned automated driving and starts the autonomous parking event to move to the parking space PS in a parking lot PA. A start trigger of the autonomous parking event may be, for example, any operation of an occupant, or may be wireless reception of a predetermined signal from the parking lot management device 400. When the autonomous parking controller 142 starts the autonomous parking event, the autonomous parking controller 142 controls the communication device 20 such that a parking request is transmitted to the parking lot management device 400. The vehicle M moves from the stop area 310 to the parking lot PA according to guidance of the parking lot management device 400 or while performing its own sensing.

The first camera 500 is provided between the stop area 310 and the gate 300-in. The first camera 500 images a vehicle that passes through the gate 300-in, a vehicle that has passed through the gate 300-in, or a vehicle that is present between the stop area 310 and the gate 300-in. The first camera 500 transmits a captured image to the parking lot management device 400. Hereinafter, a space between the stop area 310 and the gate 300-in is referred to as a "space AR1." The space AR1 is a space in which a vehicle to use the stop area 310 waits when the stop area 310 is congested. The first camera 500 images, for example, the space AR and the vehicle in a bird's-eye view direction.

The display device 540 is provided between the stop area 310 and the gate 300-in. The display device 540 is provided, for example, at a position that visible to a user of the vehicle that has passed through the gate 300-in or a vehicle that is present between the stop area and the gate 300-in. The display device 540 displays information on the basis of an instruction of the parking lot management device 400, for example. The display device 540 displays information indicating a use situation of the stop area 310 or information indicating whether the stop area can be used.

A second camera 520 is provided near the stop area 310. The second camera 520 images the stop area 310. The second camera 520 images the stop area 310 in a bird's-eye view direction, for example. The second camera 520 transmits the captured image to the parking lot management device 400.

Figure 5:
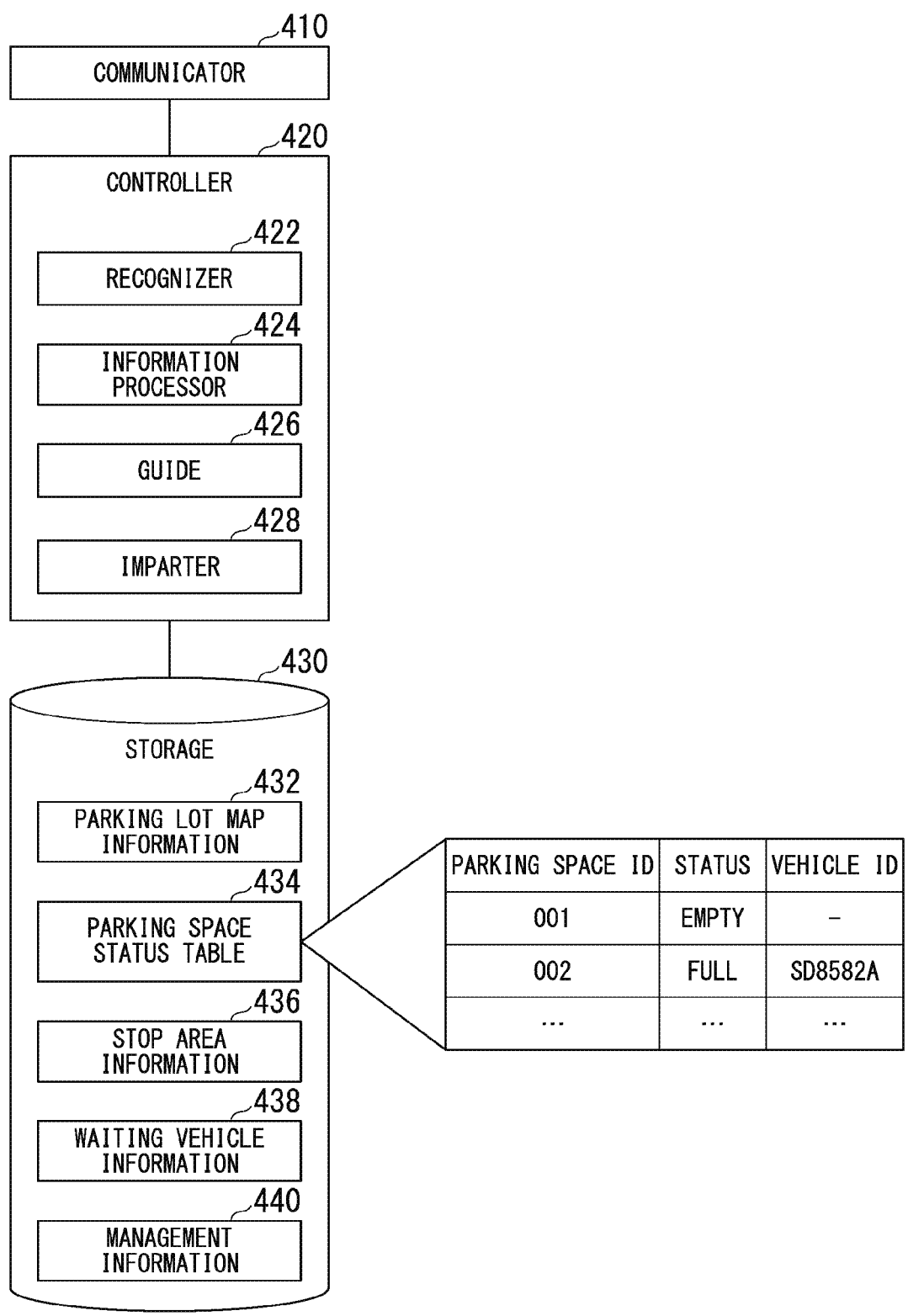
FIG. 5 is a diagram showing an example of a configuration of a parking lot management device.

FIG. 5 is a diagram showing an example of a configuration of the parking lot management device 400. The parking lot management device 400 includes, for example, a communicator 410, a controller 420, and a storage 430. The controller 420 includes, for example, a recognizer 422, an information processor 424, a guide 426, and an imparter 428. The storage 430 stores, for example, information such as parking lot map information 432, a parking space status table 434, stop area information 436 (see FIG. 7), waiting vehicle information 438 (see FIG. 7), and management information 440 (see FIG. 12).

The communicator 410 wirelessly communicates with the vehicle M or other vehicles. The controller 420 guides the vehicle M to the parking space PS on the basis of the information acquired by the communicator 410 and the information stored in a storage 430. The parking lot map information 432 is information that geometrically represents a structure of the parking lot PA. The parking lot map information 432 includes coordinates for each parking space PS. The parking space status table 434 is, for example, a table in which a status indicating whether the parking space is empty or full (occupied) and a vehicle ID that is identification information of parked vehicles M when the parking space is full are associated with a parking space ID that is identification information of the parking space PS.

When the communicator 410 receives the parking request from the vehicle M, the controller 420 extracts the parking space PS that is empty by referring to the parking space status table 434, acquires a position of the extracted parking space PS from the parking lot map information 432, and transmits a suitable route to the acquired position of the parking space PS to the vehicle M using the communicator 410. The controller 420 instructs a specific vehicle M to, for example, stop or slow down, as necessary, on the basis of positional relationships between a plurality of vehicles M so that the vehicles M do not travel to the same position at the same time.

In the vehicle M that has received the route, the autonomous parking controller 142 generates a target trajectory based on the route. When the vehicle M approaches the parking space PS, which is a target, the parking space recognizer 132 recognizes parking frame lines or the like that partition the parking space PS, recognizes a detailed position of the parking space PS, and provides the position to the autonomous parking controller 142. The autonomous parking controller 142 receives the position, corrects the target trajectory, and parks the vehicle M in the parking space PS.

[Autonomous Parking Event-at Time of Exit]

The autonomous parking controller 142 and the communication device 20 remain in an operating state even when the vehicle M is parked. The autonomous parking controller 142 activates a system of the vehicle M and moves the vehicle M to the stop area 330, for example, when the communication device 20 has received a vehicle pick-up request from the terminal device 700 of the occupant. In this case, the autonomous parking controller 142 controls the communication device 20 such that a travel start request is transmitted to the parking lot management device 400. The controller 420 of the parking lot management device 400 instructs a specific vehicle, for example, to stop or slow down, as necessary, on the basis of positional relationships between a plurality of vehicles so that the vehicles do not travel to the same position at the same time, similar to at the time of entry. When the vehicle M is moved to the stop area 330 and an occupant boards the vehicle M, the autonomous parking controller 142 stops an operation, and then manual driving or automated driving by another functional unit is started. The stop area 330 faces a boarding and alighting area 340 connected to the visit destination facility.

The present invention is not limited to the above, and the autonomous parking controller 142 may find the empty parking space by itself on the basis of detection results of the camera 10, the radar device 12, the finder 14, or the object recognition device 16 without depending on communication, and park the vehicle M in the found parking space.

A third camera 600 is provided near the stop area 330. The third camera 600 images the stop area 330. The third camera 600 images the stop area 330 in a bird's-eye view direction, for example. The third camera 600 transmits the captured image to the parking lot management device 400.

[Functions of Function Units Included in Controller]

The recognizer 422 recognizes a use situation of the stop area 310 or the stop area 330 (hereinafter, a stop area) in which the vehicle stops. The "use situation" includes information indicating the presence or absence of a space in which the vehicle stops, information indicating a size of the space, and the like. The stop area is an example of an area in which a user of a vehicle boards or alights the vehicle, the user takes luggage out of the vehicle, or the user loads luggage into the vehicle.

The information processor 424 specifies the size of the space in which the vehicle stops in the stop area or specifies the size of the vehicle on the basis of a recognition result of the recognizer 422.

The guide 426 guides the second vehicle having a smaller vehicle body than a vehicle body of the first vehicle to the specific area when there is no first stop space and there is a second stop space in the stop area, on the basis of the above use situation. For example, the guide 426 guides the second vehicle to the stop area in preference to the first vehicle. For example, the guide 426 performs preference guidance on the basis of a processing result of the recognizer 422 or a processing result of the information processor 424.

The first vehicle is, for example, a vehicle having a larger vehicle body than the second vehicle. The first stop space is, for example, a space in which the first vehicle or the second vehicle can stop. The second stop space is, for example, a space in which the first vehicle cannot stop and the second vehicle can stop. A vehicle using the stop area, the first vehicle, or the second vehicle is, for example, a vehicle that exits a parking lot through automated driving or a vehicle that enters a parking lot from a specific area through automated driving.

The imparter 428 imparts a reward to the first vehicle when the second vehicle has preference over the first vehicle in a case in which there is no first stop space and there is the second stop space in the specific area. The imparter 428 imparts a reward to the first vehicle when the second vehicle has preference over the first vehicle in a case in which a priority of the first vehicle is higher than that of the second vehicle. Hereinafter, processes of these functional units will be described in detail.

[Scene 1]

When the priority of the first vehicle is higher than the priority of the second vehicle, the guide 426 guides the first vehicle to a specific area (for example, the stop area 310 or a first stop space P1 to be described below) when there is the first stop space. The guide 426 guides the first vehicle to the specific area when there is the first stop space in a case in which the first vehicle and the second vehicle are waiting for the use of the specific area. An order of use of the specific area is set on the basis of an order in which the vehicles are arranged at a position designated for use of the specific area.

Figure 6:
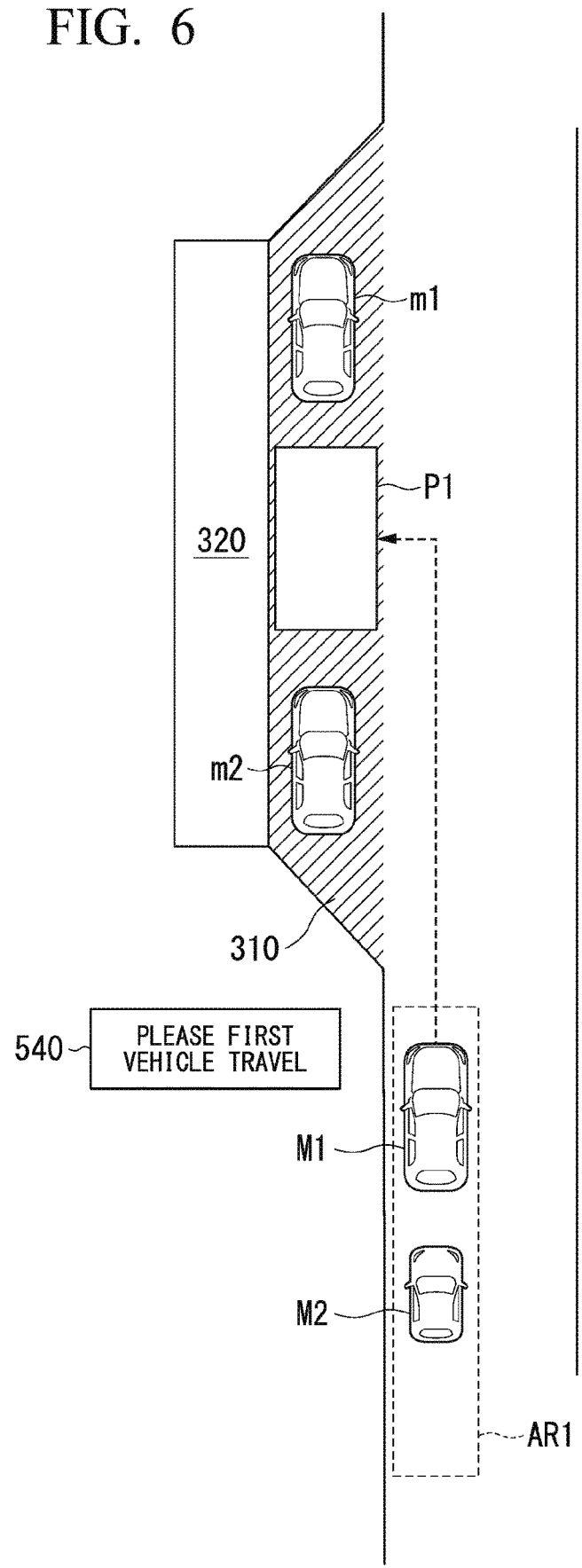
FIG. 6 is a diagram showing an example of a scene in which a vehicle enters a stop area.

FIG. 6 is a diagram showing an example of a Scene in which the vehicle enters the stop area 310. In the example of FIG. 6, attention is paid to the stop area 310. In the example of FIG. 6, the first camera 500 and the second camera 520 are omitted (the same applies to FIGS. 8, 13, 16, and 17).

In the space AR1, the first vehicle M1 and the second vehicle M2 are arranged in an order of proximity to the stop area 310. In this case, a priority of use of the stop area 310 is higher for the first vehicle M1 than for the second vehicle M2. A priority of a vehicle close to the stop area 310 is higher than that of a vehicle far from the stop area 310. That is, a priority is set for the first vehicle M1 and the second vehicle M2, and the priority is set on the basis of an order in which the vehicles are arranged at a position (for example, the space AR) designated for use of the specific area. The priority may be an order of entry of a facility or an order set in advance, instead of the order of the arrangement. The designated position is not limited to the space AR and may be a predetermined position.

In the stop area 310, the first stop space P1 is present between the other vehicle m1 and the other vehicle m2 that have stopped. The "first stop space P1" is a space in which the first vehicle M1 or the second vehicle M2 can stop.

In the above situation, the guide 426 guides the first vehicle M1 to the first stop space P1 (the stop area 310). "Guide" means that the guide 426 urges the first vehicle M1 to travel to the stop area 310. For example, the guide 426 displays information indicating that there is the first stop space P1, information indicating that the first vehicle M1 can stop in the stop area 310, and information indicating that the first vehicle M1 may travel toward the stop area 310 on the display of the display device 540. The guide 426 may notify the first vehicle M1 or the terminal device 700 of the user of information for urging the vehicle to travel to the stop area 310 instead of (or in addition to) displaying the information on the display of the display device 540.

When the first vehicle M1 is performing automated driving, the guide 426 instructs the first vehicle M1 to travel to the specific area. The first vehicle M1 travels to the specific area on the basis of an instruction from the guide 426.

[Process in Scene 1]

Figure 7:
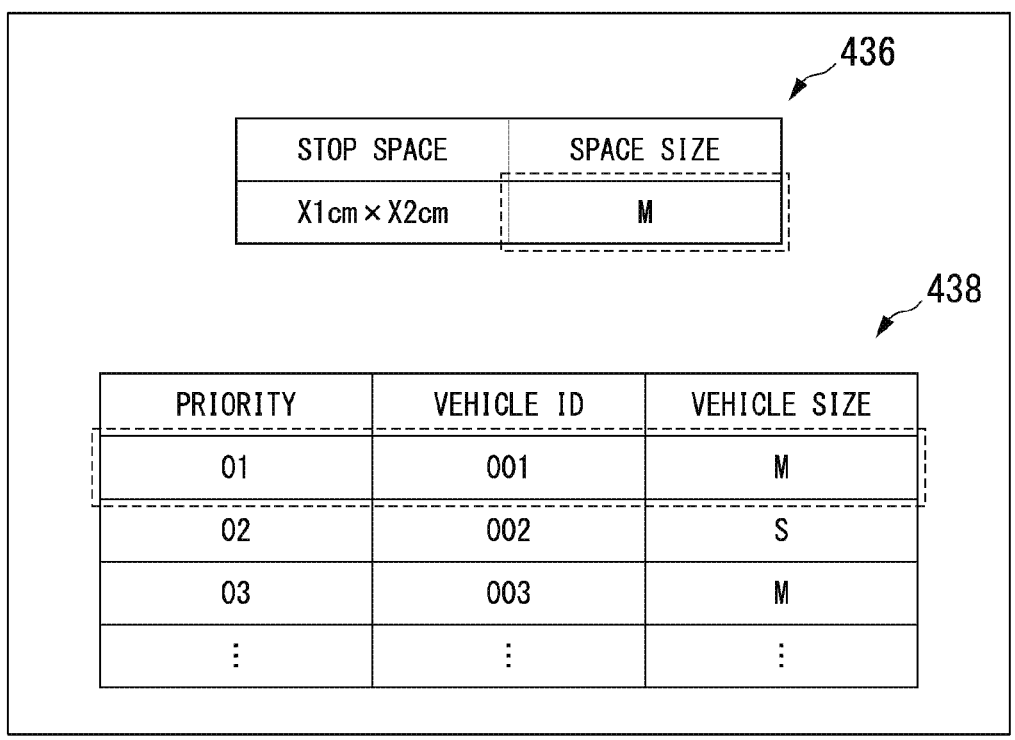
FIG. 7 is a conceptual diagram for when a process in a scene 1 is performed.

FIG. 7 is a conceptual diagram for when a process in Scene 1 is performed. The recognizer 422 of the parking lot management device 400 recognizes a stop space of the stop area 310, the other vehicle m1, the other vehicle m2, and a space between the other vehicle m1 and the other vehicle m2 on the basis of the image captured by the second camera 520. The image captured by the second camera 520 is, for example, an image obtained by imaging the stop area 310 in a bird's-eye view direction as shown in FIG. 6.

The information processor 424 refers to a first correspondence table (not shown) to specify a space size (for example, "M") corresponding to the stop space. The first correspondence table is information in which the stop space and a space size (for example, "S"<"M"<"L") are associated with each other. The information processor 424 stores information including at least the specified space size as the stop area information 436 in the storage 430. The space size M corresponds to the first stop space.

The recognizer 422 recognizes the space AR, the first vehicle M1 and the second vehicle M2 present in the space AR, and a range (size) of each vehicle on the basis of the image captured by the first camera 500. The image captured by the first camera 500 is, for example, an image obtained by imaging the stop area 310 in a bird's-eye view direction, as shown in FIG. 6.

The information processor 424 refers to a second correspondence table (not shown) to specify vehicle sizes (for example, "S"<"M"<"L") of the first vehicle M1 and the second vehicle M2. The second correspondence table is information in which the vehicle size and the range of the vehicle are associated with each other. The information processor 424 stores information in which the specified vehicle size, the vehicle ID, and the priority are associated with each other as the waiting vehicle information 438 in the storage 430. The vehicle size M is a size included in the first stop space. A process of associating the vehicle in the captured image with the vehicle ID will be described with reference to FIG. 10.

When there is a space size including a vehicle size of a vehicle with the highest priority in the waiting vehicle information 438, the guide 426 guides the vehicle to the specific area. In the examples of FIGS. 6 and 7, the guide 426 guides the first vehicle M1 with a vehicle ID 001 to the first stop space P1.

Thereby, the first vehicle M1 can rapidly travel to the specific area when the first stop space P1 appears.

[Scene 2]

When the priority of the first vehicle is higher than the priority of the second vehicle, the guide 426 guides the second vehicle to a specific area (for example, the stop area 310 or a second stop space P2 to be described below) when there is no first stop space and there is a second stop space. The guide 426 guides the second vehicle to the specific area when there is no first stop space and there is the second stop space in a case in which the first vehicle and the second vehicle are waiting for the use of the specific area.

Figure 8:
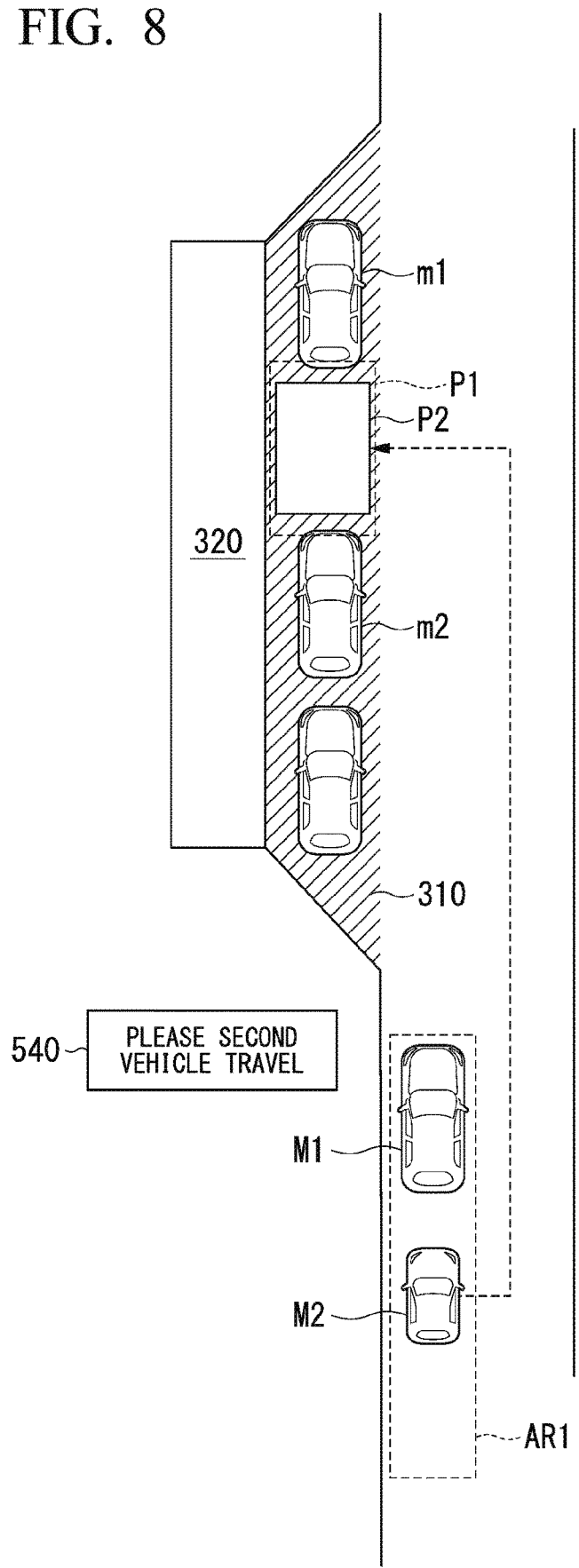
FIG. 8 is a diagram showing another example of the scene in which a vehicle enters the stop area.

FIG. 8 is a diagram showing another example of the Scene in which the vehicle enters the stop area 310. Differences between FIG. 8 and FIG. 6 will be described. In the stop area 310, the second stop space P2 is between the other vehicle m1 and the other vehicle m2 that have stopped. In this case, the guide 426 guides the second vehicle M2 to the second stop space P2 (the stop area 310). That is, the guide 426 guides the second vehicle M2 to the specific area in preference to the first vehicle M1 when there is no first stop space P1 and there is the second stop space P2 in the specific area on the basis of the use situation recognized by the recognizer 422 (preference guidance). When the guide 426 performs the preference guidance, the guide 426 performs guidance to cause the second vehicle M2 to pass the first vehicle M1.

The "second stop space" is a space in which the first vehicle M1 cannot stop and the second vehicle M2 having a smaller vehicle body size than the first vehicle can stop. "Guide" means that the guide 426 urges the second vehicle M2 to travel to the stop area 310, as described in Scene 1.

When the second vehicle M2 is performing automated driving, the guide 426 instructs the second vehicle M2 to travel to the specific area. The second vehicle M2 travels to the specific area on the basis of the instruction of the guide 426.

[Process in Scene 2]

Figure 9:
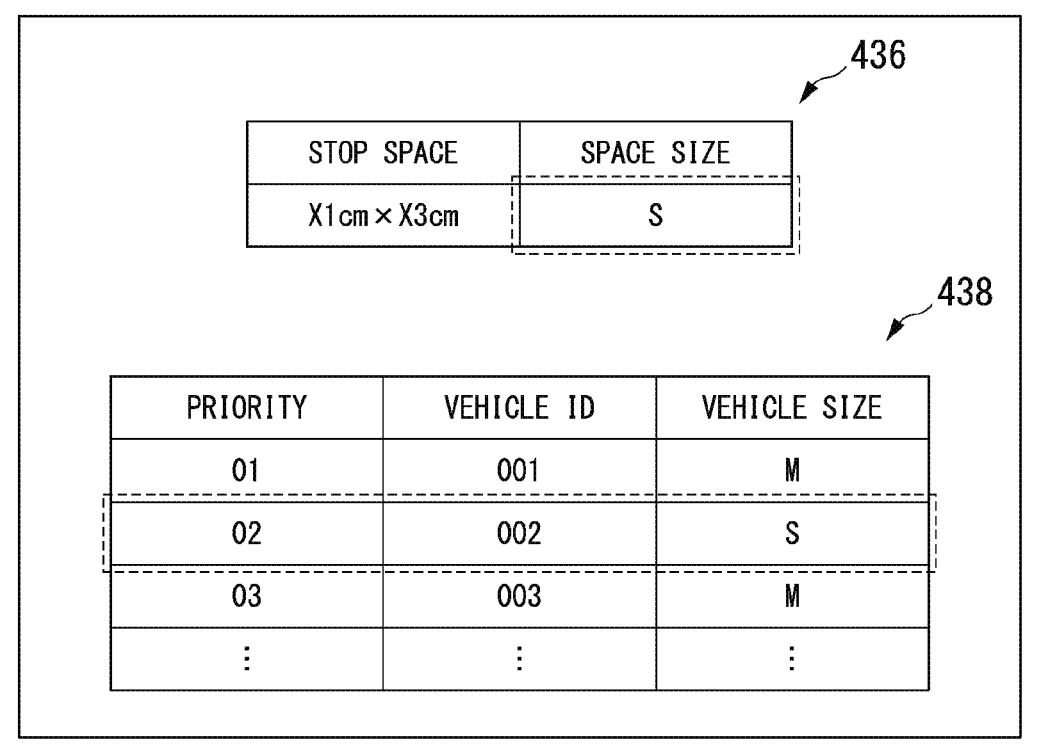

FIG. 9 is a conceptual diagram for when a process in the Scene 2 is performed. differences between FIG. 9 and FIG. 7 will be described. The information processor 424 refers to the first correspondence table to specify a space size (for example, "S") corresponding to a range of the space. The information processor 424 refers to the second correspondence table to specify a vehicle size (for example, "S") of the second vehicle M2.

The guide 426 guides the second vehicle M2 to the specific area when there is no space size including a vehicle size of the first vehicle M1 having the highest priority in the waiting vehicle information 438 (the space size is space size in which the first vehicle M1 can park) and there is a space size including the second vehicle M2 having the second highest priority after the first vehicle M1 (the space size is space size in which the second vehicle M2 can park). In the examples of FIGS. 8 and 9, the guide 426 guides the second vehicle M2 with a vehicle ID 002 to the second stop space P2.

Thus, the second vehicle M2 can rapidly travel to the specific area when the first stop space P1 does not appear and the second stop space P2 appears. The use of the stop area is made efficient by the second vehicle M2 traveling to the second stop space P2. Thereby, the use of the parking lot through the stop area is made efficient. As a result, facilities (for example, facilities including a parking lot) are used more efficiently.

[Flowchart (Part 1)]

Figure 10:
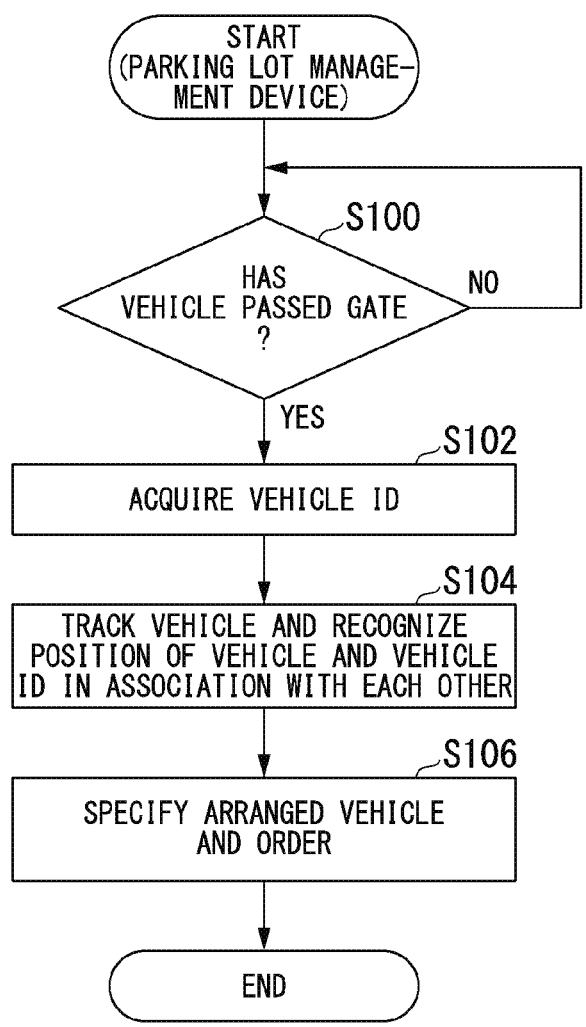
FIG. 10 is a flowchart (part 1) showing an example of a flow of a process that is executed by the parking lot management device.

FIG. 10 is a flowchart (part 1) showing an example of a flow of a process that is executed by the parking lot management device 400. This process is a process of recognizing the vehicle that has passed through the gate 300-in.

First, the controller 420 of the parking lot management device 400 determines whether or not a vehicle has passed the gate 300-in (step S100). When the controller 420 has determined that the vehicle has passed through the gate 300-in, the controller 420 acquires a vehicle ID (step S102). For example, the controller 420 acquires, from the gate 300-in, information indicating that the vehicle has passed, and information indicating a result of communication between the vehicle and the gate 300-in. The information indicating the communication result includes, for example, the vehicle ID or a user ID. In this case, the gate 300-in communicates with the vehicle when the vehicle passes through the gate 300-in, and acquires the vehicle ID or the user ID.

The parking lot management device 400 may recognize a license plate of the vehicle from an image captured by a camera provided near the gate 300-in, and acquire the vehicle ID associated with the license plate on the basis of a recognition result. In this case, the recognizer 422 recognizes the license plate of the vehicle from the image.

Then, the recognizer 422 tracks the vehicle that has passed through the gate 300-in, and recognizes a position of the vehicle and the vehicle ID in association with each other (step S104). The recognizer 422 recognizes a vehicle passing through the gate 300-in, traveling in the space AR1, or stopping in the space AR1, the position of the vehicle, and the vehicle ID on the basis of the image captured by the first camera 500.

Then, the recognizer 422 specifies vehicles arranged in the space AR1 and an order of the vehicles on the basis of a recognition result in step S104 (step S106). Thereby, the process of this flowchart ends.

Thus, the parking lot management device 400 can specify the vehicle that has passed through the gate 300-in, the position of the vehicle, and the vehicle ID.

The parking lot management device 400 may track the vehicle on the basis of position information and the vehicle ID transmitted by the vehicle and specify the position of the vehicle in a facility.

[Flowchart (Part 2)]

Figure 11:
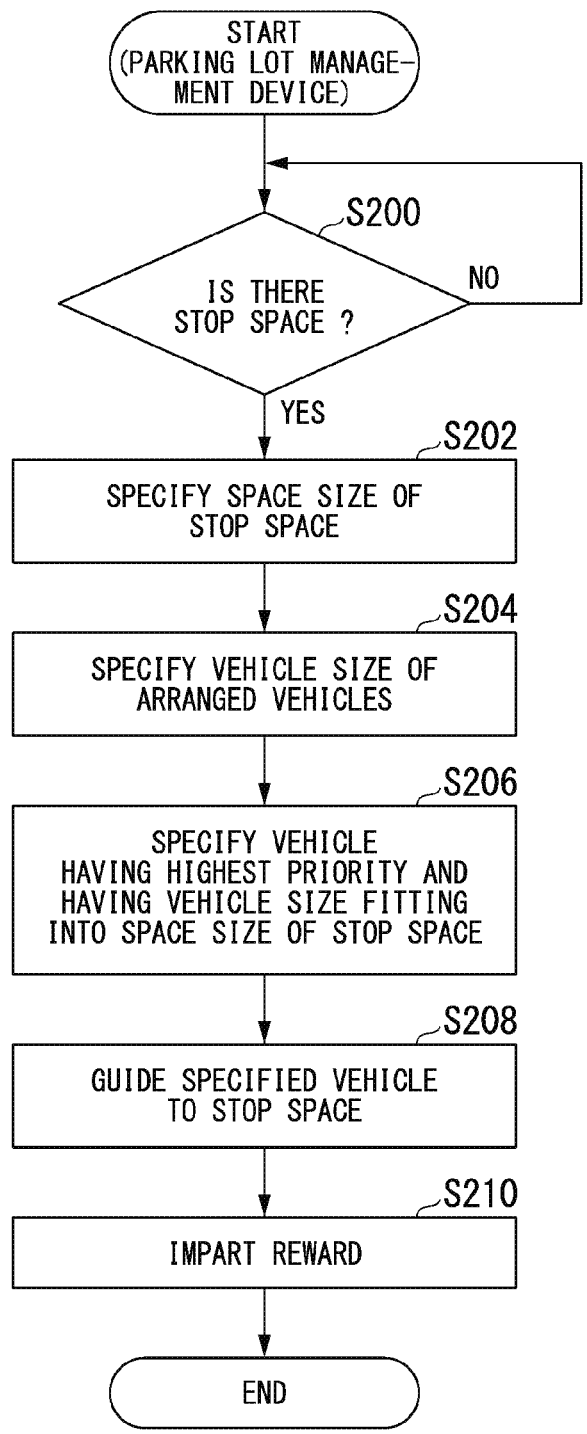
FIG. 11 is a flowchart (part 2) showing an example of a flow of a process that is executed by the parking lot management device.

FIG. 11 is a flowchart (part 2) showing an example of a flow of a process that is executed by the parking lot management device 400. This process is a process of guiding the vehicle to the stop space. This process is, for example, a process that is executed when the stop area 310 is congested (a predetermined number or more of vehicles are present in the stop area 310) and vehicles are waiting in the space AR1.

The recognizer 422 of the parking lot management device 400 determines whether or not there is a stop space (step S200). Then, the information processor 424 specifies a space size of the stop space (step S202). Then, the information processor 424 specifies vehicle sizes of vehicles arranged in the space AR1 (step S204).

Then, the information processor 424 specifies a vehicle having the highest priority in the waiting vehicle information 438 and having a vehicle size fitting into the space size of the stop space (step S206). Then, the guide 426 guides the vehicle specified in step S206 to the stop space (step S208).

Then, the imparter 428 imparts a reward to the vehicle passed by the vehicle guided in step S208 in the space AR1 (step S210). Thereby, the process of this flowchart ends.

FIG. 12 is a diagram showing an example of content of the management information 440 including information indicating a reward. The management information 440 is information in which the vehicle ID, the reward, and the parking fee are associated with each other. The parking fee is a fee derived on the basis of a time during which the vehicle uses the parking lot. The reward is a reward provided by the imparter 428. The reward is a reward that compensates for a use fee of the parking lot associated with the specific area. The reward for compensation includes a discount of a parking fee for a parking lot or an affiliated parking lot, a coupon regarding the use of the parking lot, and a coupon available at another predetermined facility (a facility incidental to or affiliated with parking lots).

As described above, the reward is imparted to the passed vehicle (a vehicle in which the order of use of the specific area is repeatedly lowered), thereby improving a sense of satisfaction or fairness for the user of the vehicle.

Although the space or the size of the vehicle is specified on the basis of the image captured in the bird's-eye view direction in the above-described embodiment, the space or the size of the vehicle may be specified on the basis of an image captured in another direction such as a horizontal direction (a direction parallel to a ground). The space or the size of the vehicle may be specified on the basis of information provided to another device or information obtained using another scheme.

[Restrictions on Preference Guidance]

The guide 426 may limit the number of times the preference guidance in which the second vehicle M2 has preference over the first vehicle M1 is performed, when there are a plurality of second vehicles M2 having a lower priority than the first vehicle M1 for use of the specific area. The guide 426 limits the number of second vehicles M2 that pass the first vehicle M1 when there are a plurality of second vehicles M2 and the second stop space continuously appears in a case in which the first vehicle and the plurality of second vehicles are waiting for use of the specific area in this order.

Figure 13:
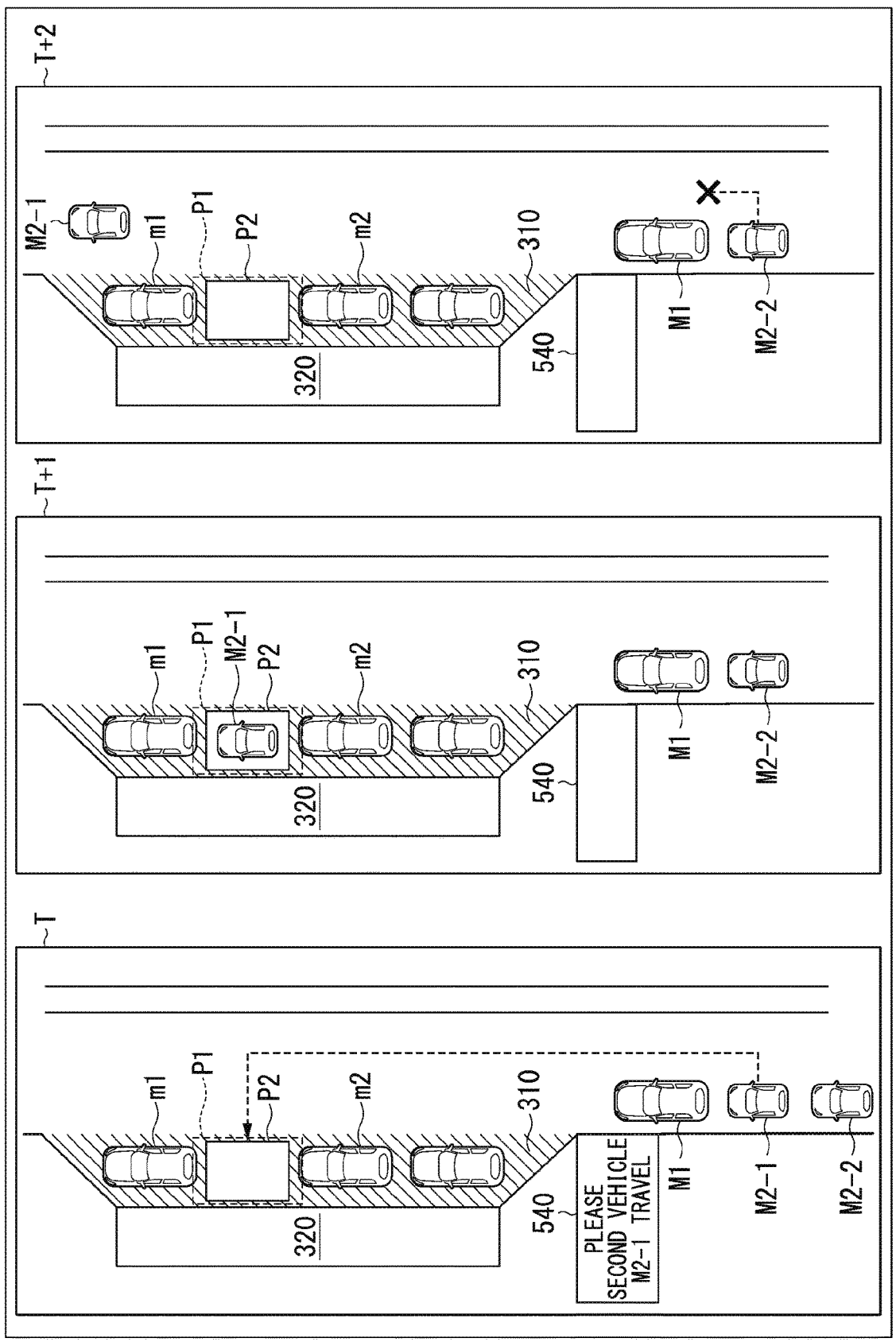
FIG. 13 is a diagram showing an example of a scene in which preference guidance is limited.

FIG. 13 is a diagram showing an example of a Scene in which preference guidance is limited. FIG. 13 is a diagram in which attention is paid to the stop area 310. In the space AR1, a first vehicle M1, a second vehicle M2-1, and a second vehicle M2-2 are arranged in order from the stop area 310. In this case, a priority of use of the stop area 310 is higher in an order of the first vehicle M1, the second vehicle M2-1, and the second vehicle 2-2. In the stop area 310, the second stop space P2 is between the other vehicle m1 and the other vehicle m2 that have stopped. In this case, at time T, the guide 426 guides the second vehicle M2-1 to the second stop space P2 (the stop area 310). At time T+1, the second vehicle M2-1 stops in the second stop space P2.

At time T+2, when the second vehicle M2-1 starts to travel from the second stop space P2 toward the parking lot, the second stop space P2 appears. In this case, the guide 426 does not guide the second vehicle M2-2 to the second stop space P2.

The guide 426 guides the first vehicle M1 to the first stop space P1 when the other vehicle m1 in front of the second stop space P2 or the other vehicle m2 behind the second stop space P2 starts to travel and the first stop space P1 appears.

Thus, the parking lot management device 400 limits the number of times the preference guidance is performed on the second vehicle M2 in preference to the first vehicle M1, such that a delay of stopping in the stop area 310 due to the first vehicle M1 being passed by the second vehicle M2 a plurality of times can be curbed. As a result, it is possible to improve a sense of fairness for the user.

Although a case in which the number of times that the first vehicle M1 is passed is one has been described in the above example, the number of times may be a predetermined number of times (for example, two) or may be a number of times set by the user. The set number of times may be a number of times determined by the user in advance. The number of times set by the user may be a number of times set by the parking lot management device 400 on the basis of inquiry to the terminal device 700 of the user or the vehicle of the user and a result of response to the inquiry. The inquiry may be performed, for example, before or after the vehicle of the user passes through the gate 300-in, or may be performed in real time.

When the above-described process is performed and, for example, the vehicle is guided to the stop space after the process of step S206 in FIG. 11, it is determined whether or not there is a vehicle that has been passed a predetermined number of times. When there is no vehicle that has been passed a predetermined number of times, the process of step S208 is performed. When there is a vehicle (target vehicle) that has been passed a predetermined number of times, the guide 426 guides the target vehicle to the stop space after the stop space in which the target vehicle can stop in the stop area 310 appears.

According to the first embodiment described above, the parking lot management device 400 guides the second vehicle M2 to the specific area in preference to the first vehicle M1 when there is no first stop space P1 and there is the second stop space P2 in the specific area on the basis of the use situation recognized by the recognizer 422, thereby allowing facilities to be used more efficiently.

Second Embodiment

A second embodiment will be described. In the second embodiment, when a second vehicle is a vehicle needing use of the first stop space, the second vehicle is regarded as a first vehicle. Hereinafter, differences between the second embodiment and the first embodiment will be described.

The parking lot management device 400 inquires the terminal device 700 or the vehicle of the user who uses the parking lot about the size of the stop space. The user who uses the parking lot may be a user who has made a reservation for use of the parking lot with respect to the parking lot management device 400 in advance, or may be a user of the vehicle that has passed through the gate 300-in. Hereinafter, content of the inquiry will be described as being displayed on a display of the vehicle.

Figure 14:
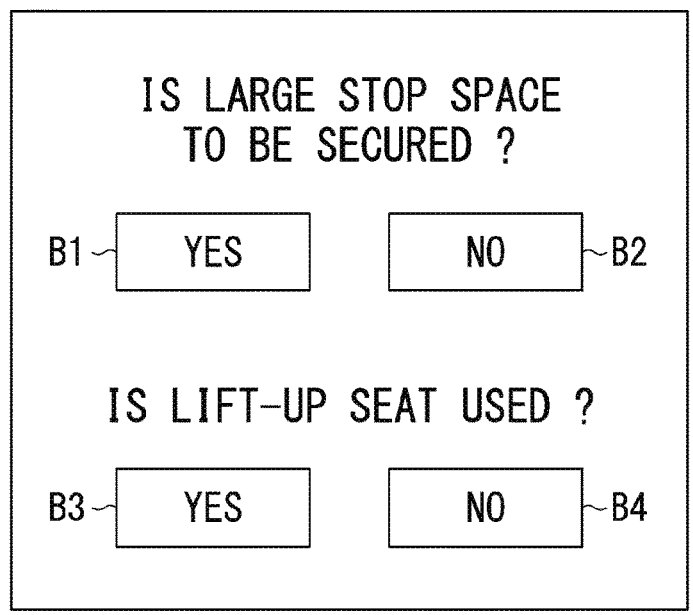
FIG. 14 is a diagram showing an example of an image IM1 including content of an inquiry displayed on a display.

FIG. 14 is a diagram showing an example of an image IM1 including the content of the inquiry displayed on the display. For example, the image IM1 includes information for inquiring about whether or not a large stop space is to be secured, a button B1 that is operated when the user desires the large stop space, and a button B2 that is operated when the user does not desire the large stop space. The image IM1 includes information for inquiring about whether or not a lift-up seat is used, a button B3 that is operated when the user desires to use the lift-up seat, and a button B4 that is operated when the user does not desire to use the lift-up seat.

Figure 15:
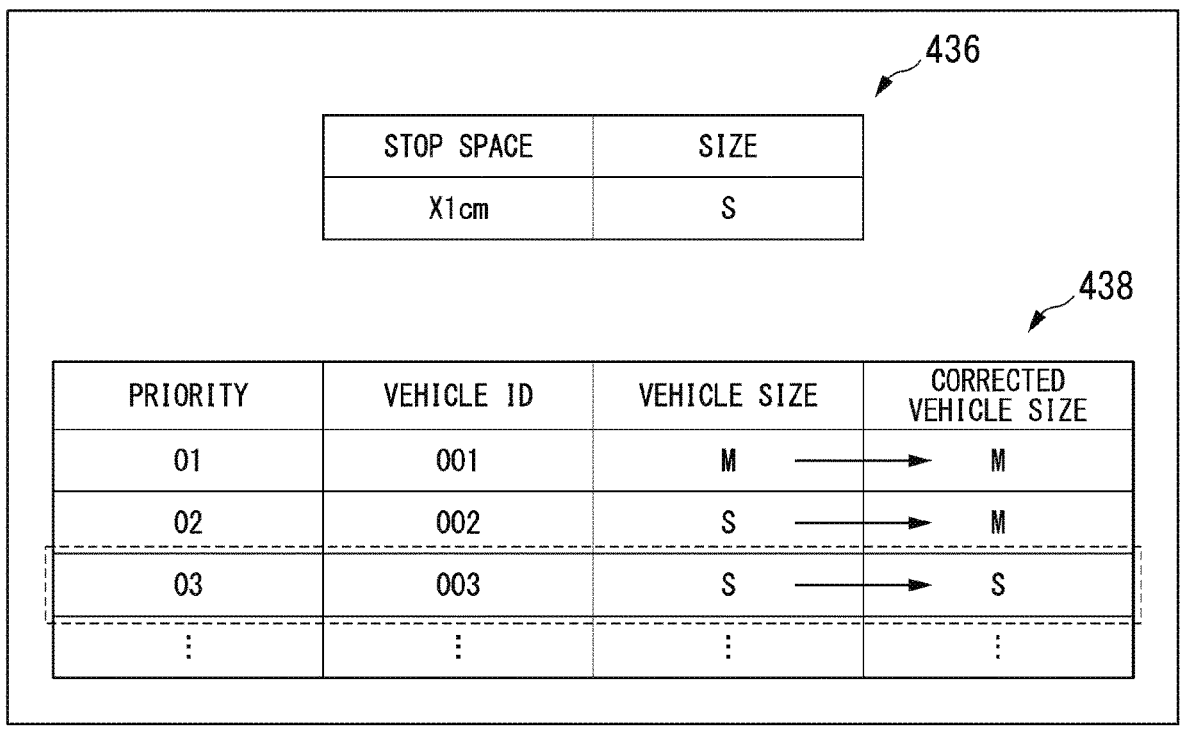
FIG. 15 is a conceptual diagram of a process of correcting a vehicle size.

The parking lot management device 400 acquires an operation result of an operation performed by the user with respect to the button of the image IM1 displayed on the display, and corrects the vehicle size on the basis of the acquired information. FIG. 15 is a conceptual diagram of a process of correcting the vehicle size. For example, when a user with a vehicle ID "002" desires a large stop space, the information processor 424 specifies a size of the vehicle with the vehicle ID "002" as "S" and then corrects the vehicle size from "S" to "M".

When there is the second stop space P2 in the stop area 310, the guide 426 guides a vehicle with a vehicle ID "003" and a corrected size "S" that can stop in the second stop space P2, to the second stop space P2 since the vehicle with the vehicle ID "002" cannot stop in the second stop space P2. That is, when the second vehicle M2 is a vehicle needing the use of the first stop space P1 designated in advance, the guide 426 regards the second vehicle M2 as the first vehicle M1 and performs a process regarding preference guidance.

A vehicle of the user who has performed an operation for the large stop space, or a vehicle that uses a device needing a larger space for vehicle boarding and alighting than that of a usual case such as a lift-up seat, is an example of a vehicle that is regarded as the first vehicle. A vehicle (or vehicle ID) regarded as the first vehicle may be stored in the storage 430 of the parking lot management device 400 in advance.

Figure 16:
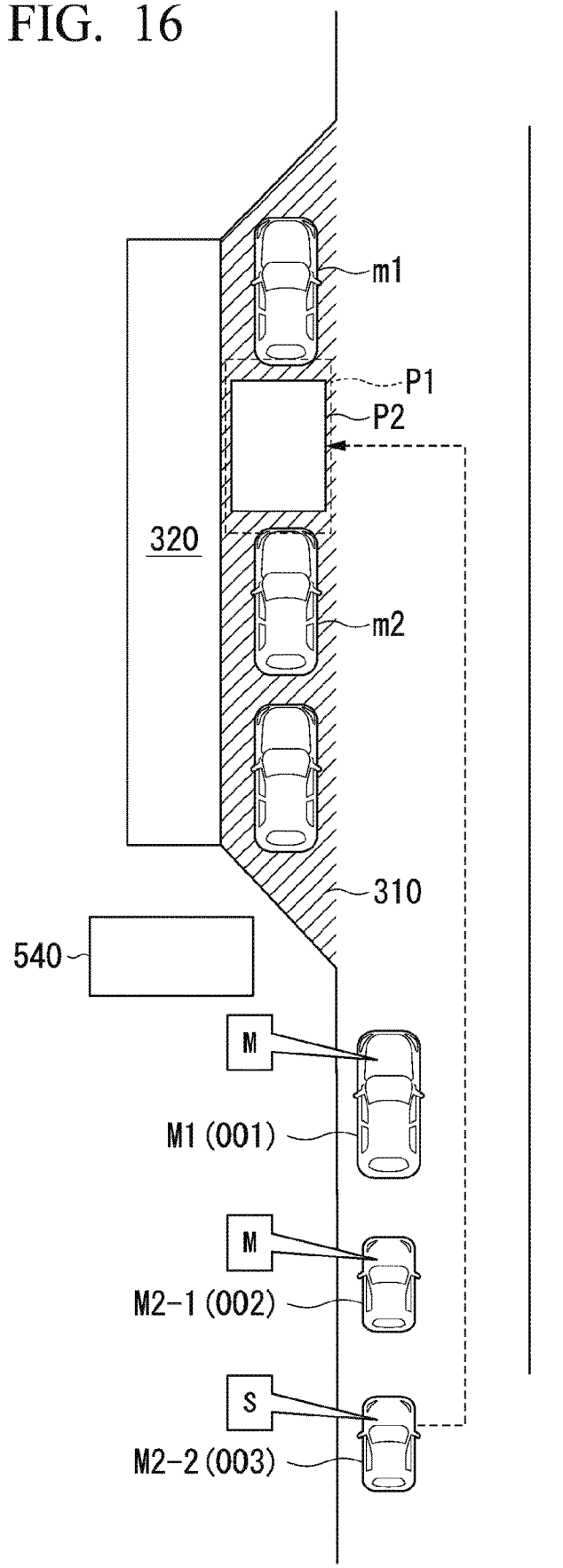
FIG. 16 is a diagram showing an example of a scene in which a second vehicle M2-2 with a vehicle ID "003" is guided to a second stop space P2.

FIG. 16 is a diagram showing an example of a scene in which a second vehicle M2-2 with a vehicle ID "003" is guided to the second stop space P2. FIG. 16 is a diagram in which attention is paid to the vicinity of a specific area. For example, when there are a first vehicle M1 (vehicle ID 001), a second vehicle M2-1 (vehicle ID 002) regarded as the first vehicle, and a second vehicle 2-2 (vehicle ID 003), and there is the second stop space P2, the second vehicle 2-2 with a vehicle size "S" passes the first vehicle M1 with a vehicle size "M" and the second vehicle M2-1 regarded as the first vehicle of which the vehicle size has been corrected to "M" and stops in the second stop space P2.

Thus, when the second vehicle is a vehicle needing the use of the first stop space designated in advance, the parking lot management device 400 can specify a vehicle with a priority according to a use aspect of the vehicle since the parking lot management device 400 regards the second vehicle as the first vehicle and performs the preference guidance.

According to the second embodiment described above, since the parking lot management device 400 regards the second vehicle as the first vehicle and performs the preference guidance, it is possible to use a facility more efficiently.

Third Embodiment

A third embodiment will be described. In the third embodiment, the parking lot management device 400 determines a vehicle to be guided to a specific area on the basis of a situation of vehicles around the second stop space P2. Hereinafter, differences between the third embodiment and the first embodiment will be described.

For example, when there is no first stop space P1 and there is the second stop space in the specific area, and a vehicle stopping in a space adjacent to the second stop space is estimated to start to travel within a predetermined time, the guide 426 interrupts the preference guidance (guiding the second vehicle to the specific area) or guides the first vehicle M1 to the specific area.

Figure 17:
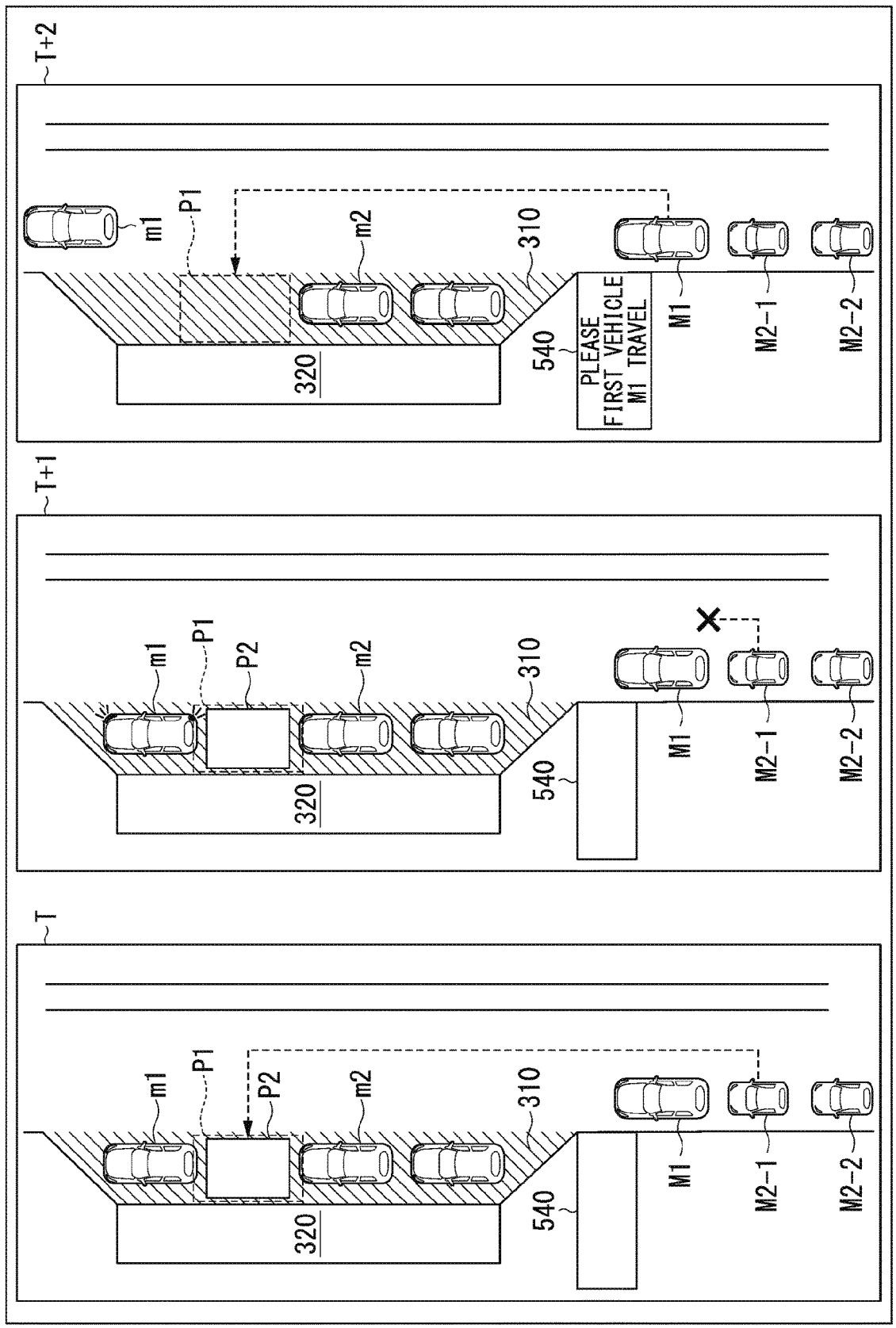
FIG. 17 is a diagram showing an example of a scene in which a vehicle to be guided to a specific area is determined on the basis of a situation of a vehicle in the second stop space P2.

FIG. 17 is a diagram showing an example of a scene in which a vehicle to be guided to a specific area is determined on the basis of a situation of a vehicle in the second stop space P2. In the example of FIG. 17, attention is paid to the stop area 310. In the space AR1, a first vehicle M1, a second vehicle M2-1, and a second vehicle 2-2 are arranged in an order from the stop area 310.

At time T, when the second stop space P2 appears, the guide 426 tries to guide the second vehicle M2-1 to the second stop space P2, for example.

At time T+1, when the controller 420 has estimated that the other vehicle m1 will start to travel within a predetermined time, the guide 426 interrupts the process of trying to guide the second vehicle M2-1 to the second stop space P2. For example, when a direction indicator of the other vehicle m1 blinks (or lights), the controller 420 estimates that the other vehicle m1 will start to travel within the predetermined time.

At time T+2, when the other vehicle m1 starts to travel, the first stop space P1 appears in front of the other vehicle m2. In this case, the guide 426 guides the first vehicle M1 to the first stop space P1. At time T+1, when the controller 420 has estimated that the other vehicle m1 will start to travel within the predetermined time, the guide 426 may guide the first vehicle M1 having a high priority to the specific area before the other vehicle m1 starts to travel.

[Flowchart]

Figure 18:
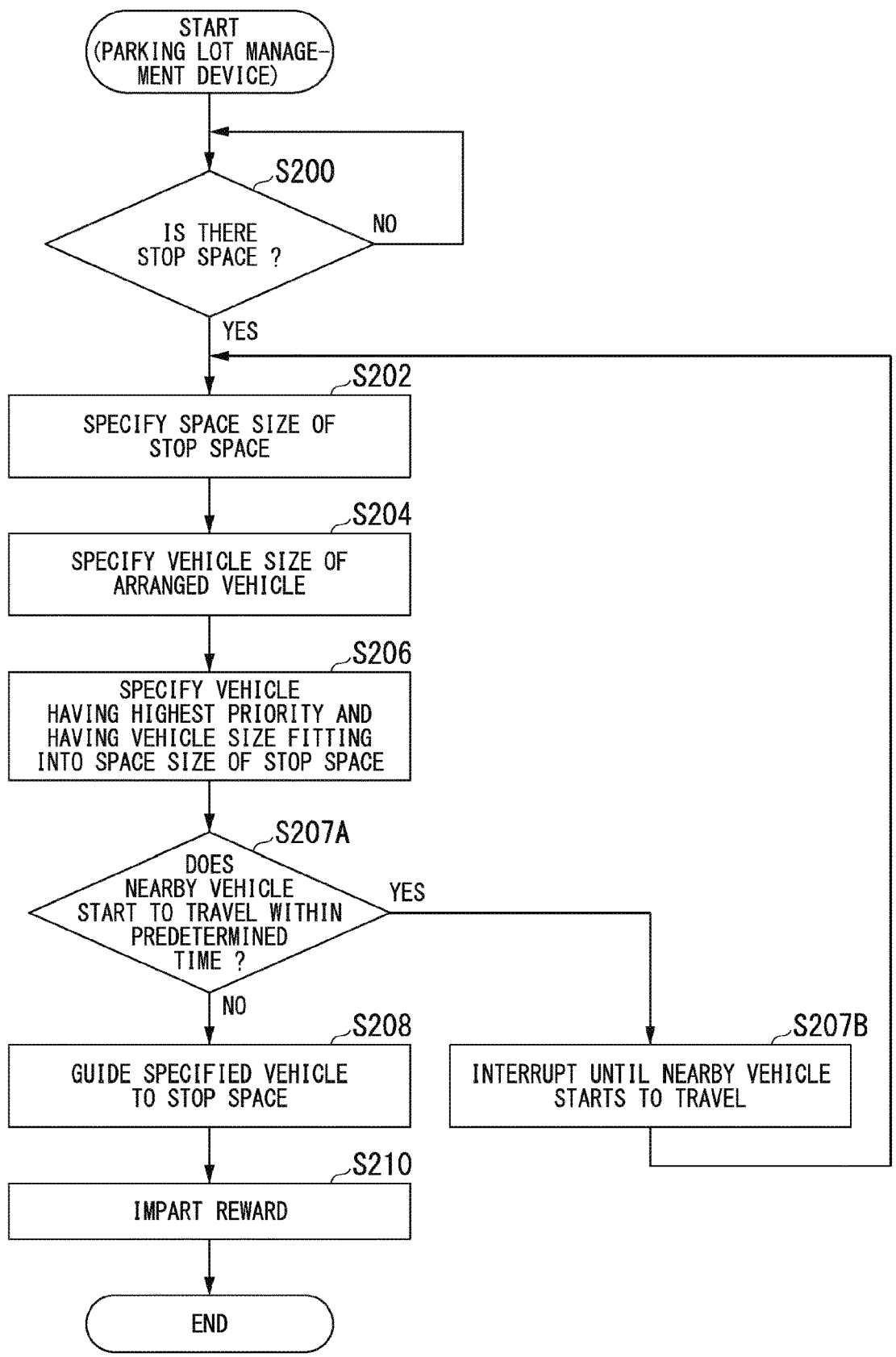
FIG. 18 is a flowchart showing an example of a flow of a process that is executed by a parking lot management device according to a third embodiment.

FIG. 18 is a flowchart showing an example of a flow of a process that is executed by the parking lot management device 400 according to the third embodiment. Since steps S200 to S206, S208, and S210 in FIG. 18 are the same as steps S200 to S206, S208, and S210 in FIG. 11, description thereof will be omitted and differences will be mainly described.

After the process of step S206, the controller 420 of the parking lot management device 400 determines whether or not a nearby vehicle in the second stop space P2 is scheduled to start to travel within a predetermined time (step S207A). When the controller 420 determines that the nearby vehicle in the second stop space P2 does not start to travel within the predetermined time, the process proceeds to step S208.

When the controller 420 determines that the nearby vehicle in the second stop space P2 starts to travel within the predetermined time, the controller 420 interrupts the execution of the preference guidance until the nearby vehicle starts to travel (step S207B). When the nearby vehicle has started to travel, the controller 420 returns to the process of step S202. The guide 426 may guide the second vehicle M2 to the second stop space P2 when the nearby vehicle does not start to travel even after the predetermined time has elapsed.

Thus, the parking lot management device 400 can curb a situation in which the first stop space P1 appears immediately after the second vehicle M2 has been guided and specify a vehicle to be guided to the specific area more fairly by controlling the execution of the preference guidance according to the situation of the nearby vehicle.

(1) Although the vehicle is estimated to start to travel within a predetermined time on the basis of the state of the direction indicator in the above example, (2) instead (or in addition), the vehicle may be estimated to start to travel within the predetermined time on the basis of the user and an opened or closed state of a door of the vehicle.

Figure 19:
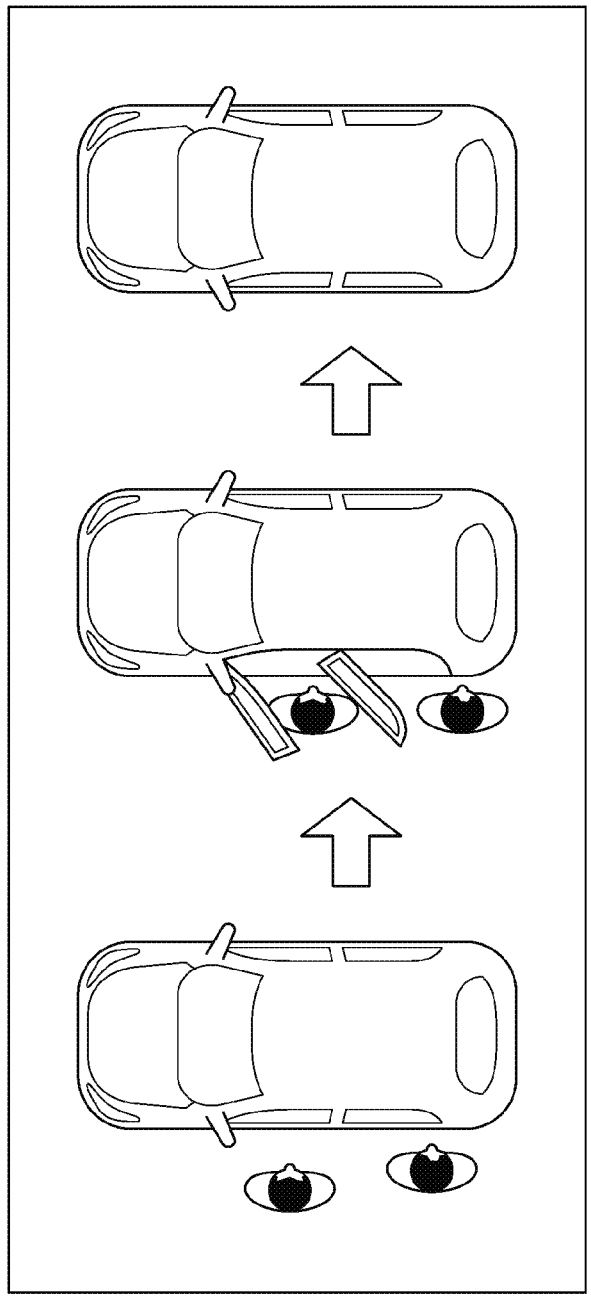
FIG. 19 is a diagram showing an example of an image captured by a second camera.

FIG. 19 is a diagram showing an example of an image captured by the second camera 520. The recognizer 422 recognizes that (a) the user approaches the other vehicle m1, (b) a door of the other vehicle m1 is opened, (c) the user boards the other vehicle m1, and (d) the door of the other vehicle m1 is closed, on the basis of a time-series image. In this case (when one or more of the above conditions (a) to (d) is satisfied), the controller 420 may estimate that the other vehicle m1 will start to travel within a predetermined time. The controller 420 may recognize that the other vehicle m1 will start to travel within the predetermined time when the condition (2) is satisfied and the condition (1) is satisfied.

According to the third embodiment described above, the parking lot management device 400 can specify a vehicle to be guided to the specific area more fairly by determining the vehicle to be guided to the specific area on the basis of the situation of the vehicles around the second stop space P2.

Modification Example

Modification examples of the first to third embodiments will be described. In the modification example, the vehicle M that is being manually driven is switched to automated driving before the vehicle M passes through the gate 300-in, when the vehicle M passes through the gate 300-in, or after the vehicle M has passed through the gate 300-in.

Figure 20:
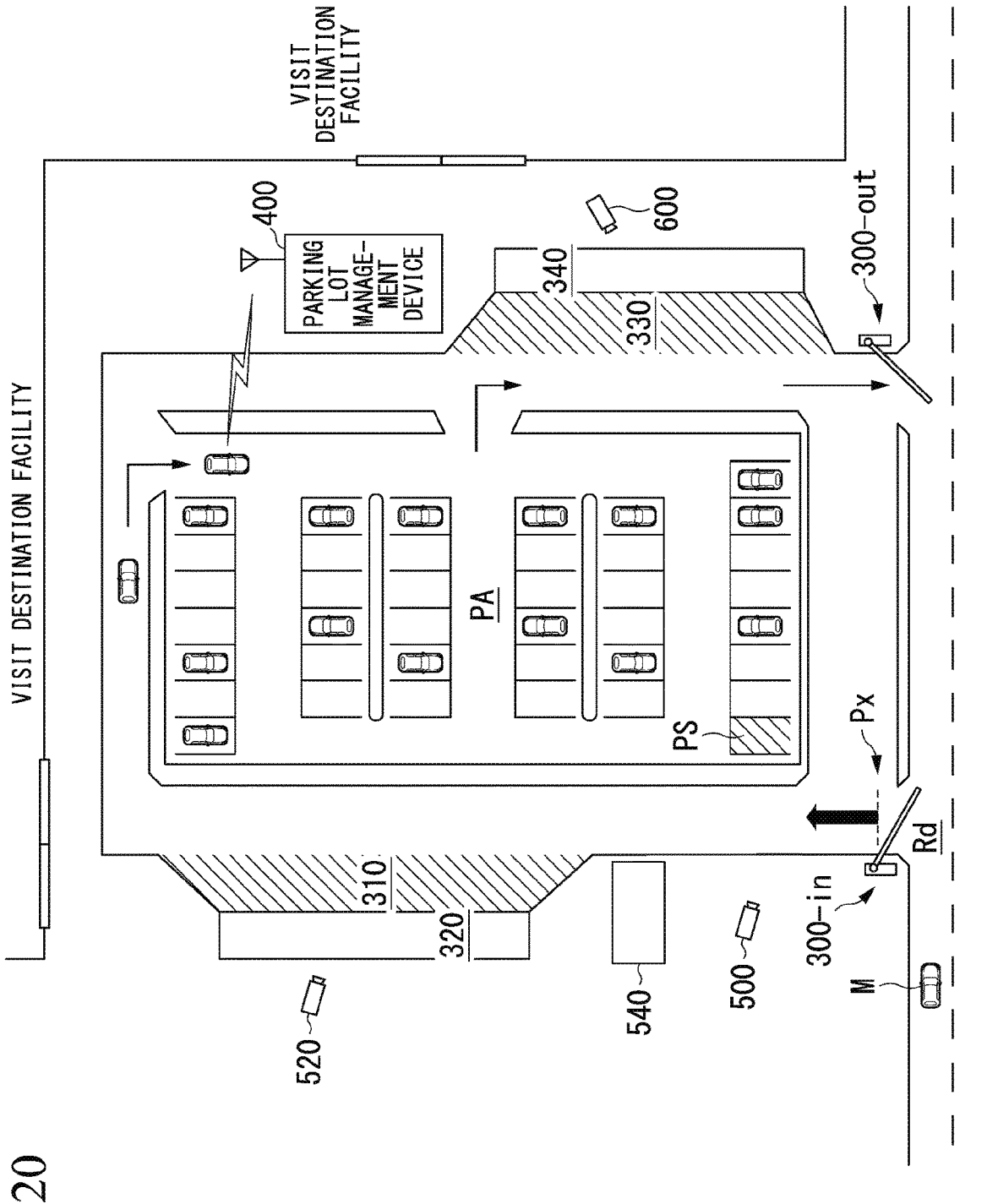
FIG. 20 is a diagram showing an example of a position at which manual operation is switched to automated driving.

FIG. 20 is a diagram showing an example of a position at which manual operation is switched to automated driving. For example, the vehicle M switches from manual driving to automated driving at a position Px immediately after the vehicle M has passed the gate 300-in. For example, the vehicle M may switch to automated driving on the basis of an instruction from the parking lot management device 400 or may switch to automated driving when it is determined that the vehicle M has reached the position Px.

As described above, the vehicle M can travel to the specific area through automated driving when a stop space appears by performing the automated driving after passing through the gate 300-in. For example, the vehicle M travels to the specific area through automated driving on the basis of an instruction of the parking lot management device 400. When the automated driving is performed, the display device 540 may be omitted.

According to the modification example described above, the vehicle M can automatically travel to the specific area by performing switching from manual driving to automated driving at a predetermined position. As a result, convenience for users is improved.

Fourth Embodiment

A fourth embodiment will be described. In the fourth embodiment, a process when the vehicle M exits the parking lot will be described. Hereinafter, differences between the fourth embodiment and the first embodiment will be described.

Figure 21:
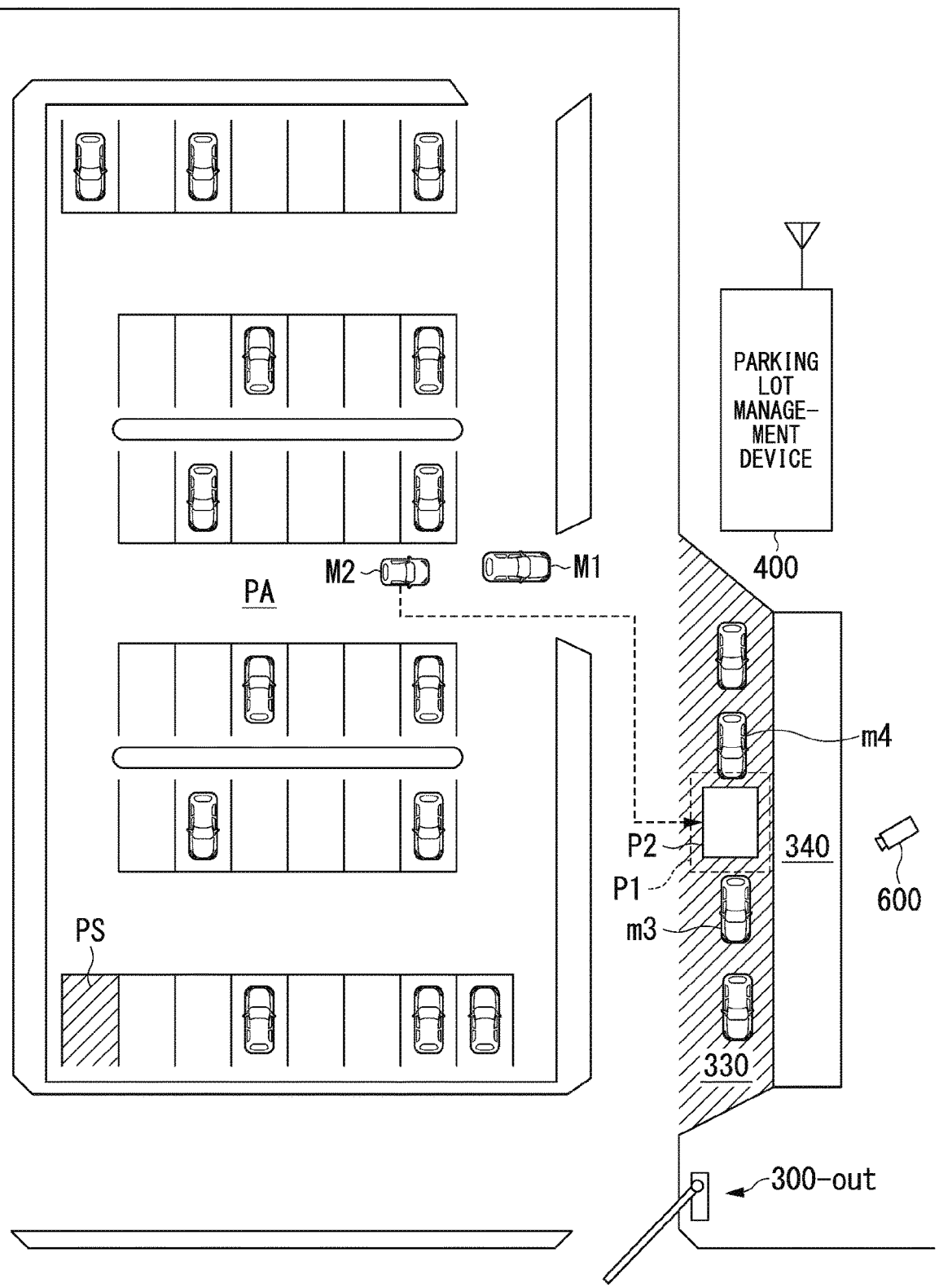
FIG. 21 is a diagram showing an example of a scene in which a vehicle enters a stop area.

FIG. 21 is a diagram showing an example of a scene in which the vehicle enters the stop area 330. FIG. 21 is a diagram in which attention is paid to the stop area 330. For example, it is assumed that the first vehicle M1 and the second vehicle M2 have a higher priority of the exit in this order. In the stop area 310, there is the second stop space P2 between stopped other vehicles m3 and m4. In this case, the guide 426 causes the second vehicle M2 to pass the first vehicle M1 and guides the second vehicle M2 to the second stop space P2 (the stop area 310).

Although the first vehicle M1 and the second vehicle M2 exit the parking space in the example of FIG. 21, the parking lot management device 400 may cause the second vehicle M2 to exit in preference to the first vehicle M1 when the first vehicle M1 and the second vehicle M2 are parked in the parking space.

Although the exit is performed through the automated driving in FIG. 21, the process of the present embodiment may be applied to a case in which the exit is performed through manual operation. In this case, the parking lot management device 400 may cause a display device provided at a predetermined position in the parking lot to display information indicating the vehicle to exit, or may notify the vehicle to exit or the terminal device 700 of the user of the vehicle of information for guiding the exit.

In the fourth embodiment described above, the following process may be applied. For example, the parking lot management device 400 may perform preference guidance on the second vehicle M2 when the user of the second vehicle M2 has reached a boarding and alighting area connected to the stop area 310 or the stop area 330, or the vicinity of the boarding and alighting area. For example, the parking lot management device 400 may recognize the user of the vehicle on the basis of an image captured by the third camera 600. For example, a feature quantity of the user of the vehicle extracted through image processing is stored in the storage 430 in association with the vehicle ID. The parking lot management device 400 specifies the user of the second vehicle M2 on the basis of the feature quantity of the user.

The parking lot management device 400 recognizes that the user has reached the boarding and alighting area on the basis of information transmitted by the terminal device 700 of the user of the second vehicle M2 (for example, position information or information indicating the user has reached the boarding and alighting area 340).

The respective processes described in the first to third embodiments and a concept of the respective processes may be applied to the fourth embodiment.

According to the fourth embodiment described above, when the vehicle exits the parking lot, the parking lot management device 400 preferentially guides the second vehicle M2 to the specific area in preference to the first vehicle M1 when there is no first stop space P1 and there is the second stop space P2 in the specific area, on the basis of the use situation recognized by the recognizer 422, thereby using the stop area efficiently. Thereby, use of a parking lot in which a vehicle traveling to the stop area is parked is made efficient. As a result, it is possible to use facilities more efficiently.

In each of the above embodiments, the process of the preference guidance in the facility including the parking lot has been described, but the present invention is not limited thereto and each embodiment may be applied to use of a predetermined area such as a stop area irrelevant to the parking lot. For example, the process of the embodiment may be applied when a vehicle is guided to a pick-up area at a rotary of a station.

[Hardware Configuration]

Figure 22:
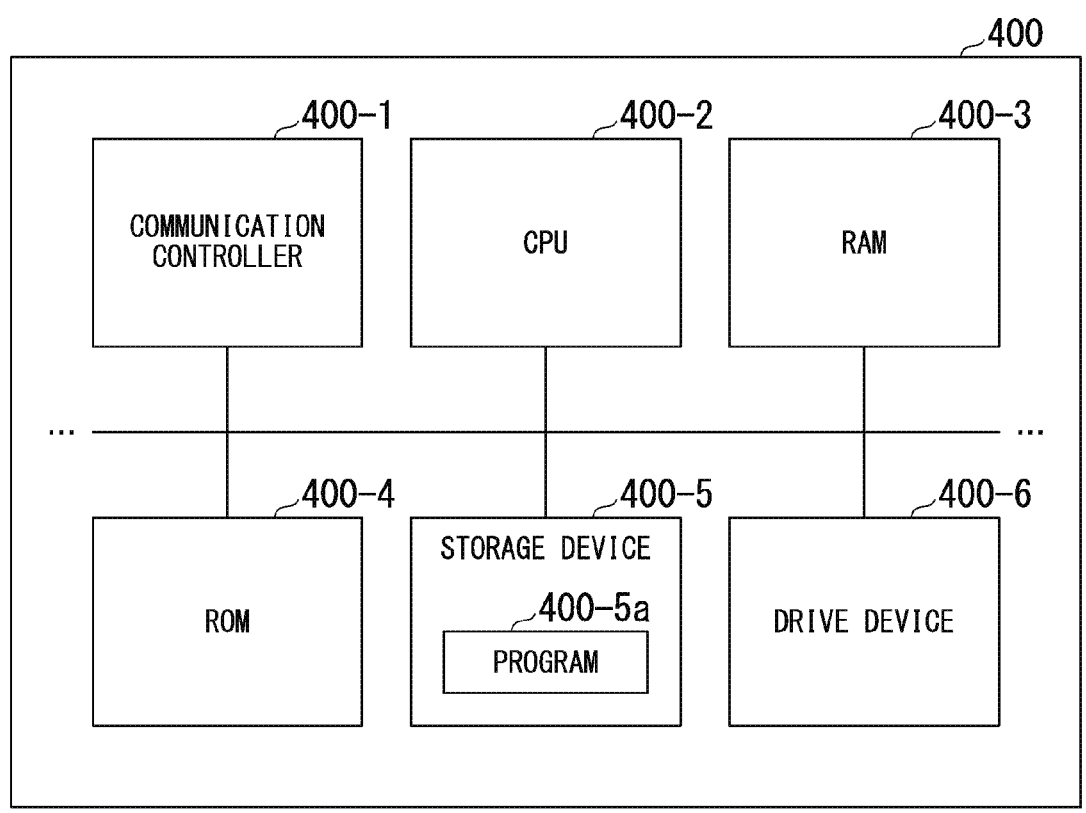
FIG. 22 is a diagram showing an example of a hardware configuration of a parking lot management device according to the embodiment.

FIG. 22 is a diagram showing an example of a hardware configuration of the parking lot management device 400 according to the embodiment. As shown in FIG. 22, the parking lot management device 400 has a configuration in which a communication controller 400-1, a CPU 400-2, a random-access memory (RAM) 400-3 used as a working memory, a read-only memory (ROM) 400-4 that stores a boot program and the like, a storage device 400-5 such as a flash memory or a hard disk drive (HDD), and a drive device 400-6 are connected to each other by an internal bus or a dedicated communication line. The communication controller 400-1 communicates with components other than the parking lot management device 400. The storage device 400-5 stores a program 400-5a that is executed by the CPU 400-2. This program is loaded into the RAM 400-3 by a direct memory access (DMA) controller (not shown) or the like, and is executed by the CPU 400-2. Thereby, some or all of the controller 420 (the recognizer 422, the information processor 424, the guide 426, and the imparter 428) are realized. The automated driving control device 100 also has a configuration in which a communication controller, a CPU, a RAM, a ROM, a storage device, a drive device, and the like are connected by an internal bus or a dedicated communication line, as in the above example. The program stored in the storage device is executed by the CPU such that the first controller 120 and the second controller 160 perform various processes.

The embodiment described above can be represented as follows.

A vehicle control device includes a storage device storing a program, and a hardware processor, and the vehicle control device is configured to recognize a use situation of a specific area for stopping of a vehicle, and guide a second vehicle having a smaller vehicle body than a vehicle body of a first vehicle to the specific area when there is no first stop space and there is a second stop space in the specific area, on the basis of the recognized use situation, by the hardware processor executing the program stored in the storage device, and the first stop space is a space in which the first vehicle or the second vehicle is able to stop, and the second stop space is a space in which the first vehicle is not able to stop and the second vehicle is able to stop.

While forms for carrying out the present invention have been described using the embodiments, the present invention is not limited to these embodiments at all, and various modifications and substitutions can be made without departing from the gist of the present invention.

What is claimed is:

1. A management device, comprising:
a processor that executes instructions to:
recognize a use situation of a specific area for stopping of a plurality of vehicles parallel to a road and in line with other parked vehicles; and
guide a second vehicle having a smaller vehicle body than a vehicle body of a first vehicle to the specific area when information indicating that there is no first stop space and there is a second stop space in the specific area is acquired, based on the use situation,
wherein the first stop space having a length this is longer than a first length of the first vehicle, and is a space in which the first vehicle or the second vehicle is able to stop parallel to the road and in line with the other parked vehicles, and
the second stop space having a length that is longer than a second length of the second vehicle, and is a space in which the first vehicle is not able to stop and the second vehicle is able to stop parallel to the road and in line with the other parked vehicles,
wherein, in a case in which the first vehicle and the second vehicle sequentially stop adjacent to the specific area and wait for use of the specific area, the second vehicle being stopped behind the first vehicle, the processor then executes instructions to:
estimate whether or not a third vehicle stopping in a space forward or behind the second stop space starts to travel within a predetermined time,
cause the second vehicle to overtake the first vehicle and guide the second vehicle to the second stop space when there is no first stop space, there is a second stop space, and it is estimated that the third vehicle does not start to travel within a predetermined time and a second stop space is not changed to the first stop space,
guide the first vehicle to the specific area when there is no first stop space, there is a second stop space, and it is estimated that the third vehicle starts to travel within a predetermined time and the second stop space is changed to the first stop space, and
guide the first vehicle to the specific area when there is the first stop space.

2. The management device according to claim 1, wherein the specific area is an area different from a parking lot, the specific area being an area in which a user of the vehicle boards, an area in which the user alights, an area in which the user takes luggage out of the vehicle, or an area in which the user loads luggage into the vehicle.

3. The management device according to claim 1, wherein the vehicle is a vehicle that exits a parking lot through automated driving or a vehicle that enters the parking lot from the specific area through the automated driving.

4. The management device according to claim 1, wherein an order of use of the specific area is set based on an order of arrangement of vehicles at a position designated for use of the specific area.

5. The management device according to claim 1, wherein the processor executes further instructions to: guide the second vehicle to pass the first vehicle when guiding the second vehicle to the specific area.

6. The management device according to claim 5, wherein, when the first vehicle and a plurality of second vehicles sequentially wait for use of the specific area in this order and the second stop space appears continuously, the processor executes further instructions to: limit a number of second vehicles that pass the first vehicle.

7. The management device according to claim 1, wherein, when the second vehicle is a vehicle needing use of the first stop space designated in advance, the processor executes further instructions to: guide the second vehicle as the first vehicle.

8. The management device according to claim 1, wherein the processor executes further instructions to:
impart a reward to the first vehicle when the second vehicle has preference over the first vehicle in a case in which there is no first stop space and there is the second stop space in the specific area.

9. The management device according to claim 1, wherein, when there is no first stop space and there is the second stop space in the specific area, and a vehicle stopping in a space adjacent to the second stop space is estimated to start to travel within a predetermined time, the processor executes further instructions to: interrupt guidance of the second vehicle to the specific area or guide the first vehicle to the specific area.

10. A management method, comprising:
recognizing, by a computer, a use situation of a specific area for stopping of a plurality of vehicles parallel to a road and in line with other parked vehicles; and
guiding, by the computer, a second vehicle having a smaller vehicle body than a vehicle body of a first vehicle to the specific area when there is no first stop space and there is a second stop space in the specific area, based on the use situation,
wherein the first stop space having a length this is longer than a first length of the first vehicle, and is a space in which the first vehicle or the second vehicle is able to stop parallel to the road and in line with the other parked vehicles, and
the second stop space having a length that is longer than a second length of the second vehicle, and is a space in which the first vehicle is not able to stop and the second vehicle is able to stop parallel to the road and in line with the other parked vehicles,
wherein, in a case in which the first vehicle and the second vehicle sequentially stop adjacent to the specific areas and wait for use of the specific area, the second vehicle being stopped behind the first vehicle,
estimating, by the computer, whether or not a third vehicle stopping in a space forward or behind the second stop space starts to travel within a predetermined time,
causing, by the computer, the second vehicle to overtake the first vehicle and guiding the second vehicle to the second stop space when there is no first stop space, there is a second stop space, and it is estimated that the third vehicle does not start to travel within a predetermined time and a second stop space is not changed to the first stop space,
guiding, by the computer, the first vehicle to the specific area when there is no first stop space, there is a second stop space, and it is estimated that the third vehicle starts to travel within a predetermined time and the second stop space is changed to the first stop space, and
guiding, by the computer, the first vehicle to the specific area when there is the first stop space.

11. A non-transitory computer-readable storage medium that stores a computer program to be executed by a computer to perform at least:
recognize a use situation of a specific area for stopping of a plurality of vehicles parallel to a road and in line with other parked vehicles; and
guide a second vehicle having a smaller vehicle body than a vehicle body of a first vehicle to the specific area when there is no first stop space and there is a second stop space in the specific area, based on the use situation,
wherein the first stop space having a length this is longer than a first length of the first vehicle, and is a space in which the first vehicle or the second vehicle is able to stop parallel to the road and in line with the other parked vehicles, and
the second stop space having a length that is longer than a second length of the second vehicle, and is a space in which the first vehicle is not able to stop and the second vehicle is able to stop parallel to the road and in line with the other parked vehicles,
wherein, in a case in which the first vehicle and the second vehicle sequentially stop adjacent to the specific area and wait for use of the specific area, the second vehicle being stopped behind the first vehicle,
estimate whether or not a third vehicle stopping in a space forward or behind the second stop space starts to travel within a predetermined time,
cause the second vehicle to overtake the first vehicle and guide the second vehicle to the second stop space when there is no first stop space, there is a second stop space, and it is estimated that the third vehicle does not start to travel within a predetermined time and a second stop space is not change to the first stop space,
guide the first vehicle to the specific area when there is no first stop space, there is a second stop space, and it is estimated that the third vehicle starts to travel within a predetermined time and the second stop space is changed to the first stop space, and
guide the first vehicle to the specific area when there is the first stop space.

12. The management device according to claim 1, wherein the first stop spacing having a length that is not longer than a total length of the first length of the first vehicle and the second length of the second vehicle, and is a space in which the first vehicle and the second vehicle is not able to stop at a same time, in parallel to the road and in line with the other parked vehicles.

* * * * *